(12) United States Patent
Katsu

(10) Patent No.: US 10,791,420 B2
(45) Date of Patent: Sep. 29, 2020

(54) INFORMATION PROCESSING DEVICE AND INFORMATION PROCESSING METHOD

(71) Applicant: SONY CORPORATION, Tokyo (JP)

(72) Inventor: Masanori Katsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/477,429

(22) PCT Filed: Nov. 30, 2017

(86) PCT No.: PCT/JP2017/042939
§ 371 (c)(1),
(2) Date: Jul. 11, 2019

(87) PCT Pub. No.: WO2018/154900
PCT Pub. Date: Aug. 30, 2018

(65) Prior Publication Data
US 2019/0373404 A1    Dec. 5, 2019

(30) Foreign Application Priority Data

Feb. 22, 2017  (JP) ................. 2017-031021

(51) Int. Cl.
*H04W 4/021*  (2018.01)
*H04W 4/029*  (2018.01)

(52) U.S. Cl.
CPC ......... *H04W 4/021* (2013.01); *H04W 4/029* (2018.02)

(58) Field of Classification Search
CPC .............................. H04W 4/021; H04W 4/029
(Continued)

(56) References Cited

U.S. PATENT DOCUMENTS 9,781,575 B1 * 10/2017 Wan ..................... H04W 4/70
10,244,363 B1 * 3/2019 Niranjayan ........ H04W 4/043
(Continued)

FOREIGN PATENT DOCUMENTS

JP    2005-099018 A    4/2005
JP    2014-192813 A    10/2014
(Continued)

OTHER PUBLICATIONS

JP2014192813A—Wu et al. Oct. 6, 2014 Googole translation (10pages).*
(Continued)

*Primary Examiner* — Mong-Thuy T Tran
(74) *Attorney, Agent, or Firm* — Chip Law Group

(57) ABSTRACT

Entering and leaving are detected with a high degree of accuracy without increasing a burden on a user. Provided is an information processing device including a determining unit that determines entering and leaving related to a designated area on the basis of collected sensor information, in which the determining unit performs determination related to the entering and leaving on the basis of a learning result learned by associating data related to the entering and leaving. Provided is an information processing method including determining, by a processor, entering and leaving related to a designated area on the basis of collected sensor information, in which the determining further includes performing determination related to the entering and leaving on the basis of a learning result learned by associating teacher data related to the entering and leaving.

17 Claims, 22 Drawing Sheets

(58) Field of Classification Search
USPC .................................................... 455/456.1
See application file for complete search history.

(56) References Cited

U.S. PATENT DOCUMENTS

| | | |
|---|---|---|
| 2005/0136845 A1 | 6/2005 | Masuoka et al. |
| 2012/0309413 A1* | 12/2012 | Grosman ............ H04W 64/006 455/456.1 |
| 2013/0226857 A1* | 8/2013 | Shim .................... H04W 4/029 706/52 |
| 2013/0252633 A1* | 9/2013 | Liang ................... H04W 4/029 455/456.1 |
| 2013/0262479 A1* | 10/2013 | Liang ............... G06F 16/24578 707/748 |
| 2014/0337123 A1* | 11/2014 | Nuernberg ......... G06Q 30/0246 705/14.45 |
| 2015/0198447 A1* | 7/2015 | Chen .................... G01S 5/0252 701/472 |
| 2016/0040902 A1 | 2/2016 | Shah |
| 2016/0300389 A1* | 10/2016 | Glenn, III ............ G01C 21/206 |
| 2016/0337810 A1 | 11/2016 | Nakagawa |
| 2017/0193553 A1* | 7/2017 | Busch ................ G06Q 30/0256 |
| 2018/0007652 A1* | 1/2018 | Sharma ................ H04B 17/318 |
| 2019/0037345 A1* | 1/2019 | Gao ........................ G06F 16/29 |

FOREIGN PATENT DOCUMENTS

| | | |
|---|---|---|
| JP | 2016-212050 A | 12/2016 |
| WO | 2015/178065 A1 | 11/2015 |
| WO | 2016/022730 A1 | 2/2016 |

OTHER PUBLICATIONS

International Search Report and Written Opinion of PCT Application No. PCT/JP2017/042939, dated Mar. 6, 2018, 08 pages of ISRWO.

* cited by examiner

FIG. 13

| FEEDBACK OF USER ON LEAVING FROM HOME | IGNITION TIMING OPTIMAL FOR USER | LABEL GENERATION METHOD |
|---|---|---|
| FAST | AFTER CURRENT IGNITION TIMING | UP TO TIMING AFTER T[s] FROM CURRENT IGNITION TIMING IS SET AS HOME |
| LATE | BEFORE CURRENT IGNITION TIMING | UP TO TIMING BEFORE T[s] FROM CURRENT IGNITION TIMING IS SET AS HOME |
| NOT PROBLEM | CURRENT IGNITION TIMING | CURRENT IGNITION RESULT IS USED AS TEACHER DATA WITHOUT BEING CORRECTED |
| NONE | UNCLEAR | CURRENT DATA IS NOT USED AS TEACHER DATA |

FIG. 14

|  | Point 1 | Point 2 |  | Point N |
|---|---|---|---|---|
| Enter | 0 | +5 | ... | 0 |
| Exit | +3 | 0 | ... | 0 |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/042939 filed on Nov. 30, 2017, which claims priority benefit of Japanese Patent Application No. JP 2017-031021 filed in the Japan Patent Office on Feburary 22, 2017. Each of the above-referenced applications is hereby incorporated herein by reference in its entirety.

TECHNICAL FIELD

The present disclosure relates to an information processing device, an information processing method, and a program.

BACKGROUND ART

In recent years, techniques for performing recognition or determination on the basis of collected sensor information and techniques for controlling operations of devices or the like on the basis of sensor information have become widespread. A technique for recognizing a behavior of a user on the basis of collected sensor information and velocity information is disclosed in, for example, Patent Document 1. Further, a geo-fence technique is an example of operation control using sensor information.

CITATION LIST

Patent Document

Patent Document 1: PCT International Publication No. 2015/178065

SUMMARY OF THE INVENTION

Problems to be Solved by the Invention

However, sensor information used for a common geo-fence technique is often limited to positioning information by global navigation satellite system (GNSS) or the like. For this reason, in many applications using the geo-fence technique, detection accuracy related to geo-fence is reduced due to factors such as, for example, multipath, and malfunction often occurs.

In this regard, the present disclosure proposes a control device, a control system, and a control method which are novel and improved and capable of detecting entering and leaving with a high degree of accuracy without increasing a burden on a user.

Solutions to Problems

According to the present disclosure, provided is an information processing device including a determining unit that determines entering and leaving related to a designated area on the basis of collected sensor information, in which the determining unit performs determination related to the entering and leaving on the basis of a learning result learned by associating data related to the entering and leaving.

Further, according to the present disclosure, provided is an information processing method including determining, by a processor, entering and leaving related to a designated area on the basis of collected sensor information, in which the determining includes performing determination related to the entering and leaving on the basis of a learning result learned by associating data related to the entering and leaving.

Further, according to the present disclosure, provided is a program causing a computer to function as a determining unit that determines entering and leaving related to a designated area on the basis of collected sensor information, in which the determining unit performs determination related to the entering and leaving on the basis of a learning result learned by associating data related to the entering and leaving.

Effects of the Invention

As described above, according to the present disclosure, it is possible to detect entering and leaving with a higher degree of accuracy without increasing a burden on a user.

Incidentally, the above effects are not necessarily limited, and effects described in this specification or other effects that can be understood from this specification may be included in addition to or instead of the above effects.

BRIEF DESCRIPTION OF DRAWINGS

FIG. 13 is a diagram illustrating a specific example of label generation in a case where a determinator according to the embodiment is learned.

FIG. 14 is a diagram illustrating an example of a correction value table according to the embodiment.

MODE FOR CARRYING OUT THE INVENTION

Figure 1:
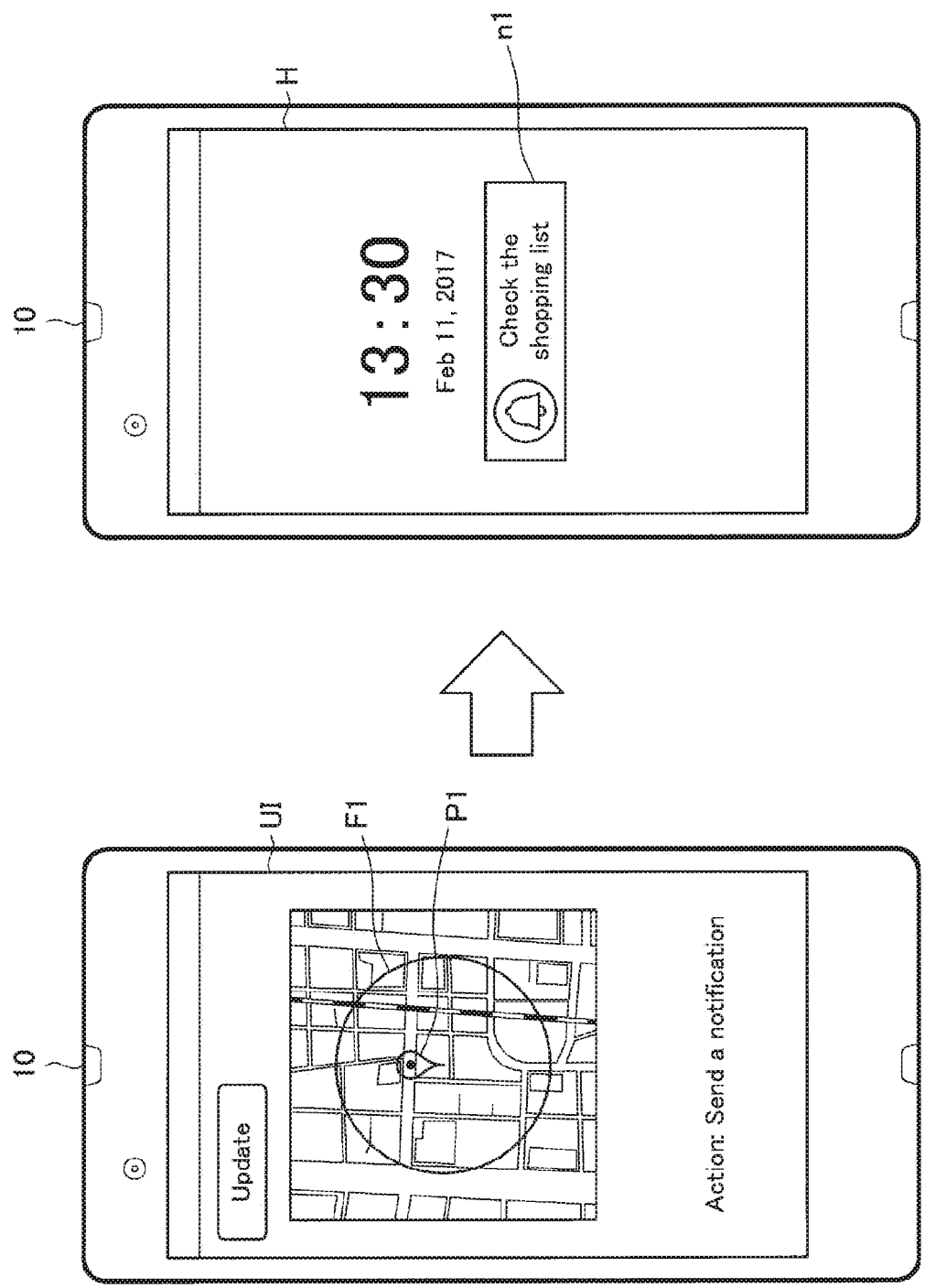
FIG. 1 is a diagram for describing an overview of geo-fence according to the present disclosure.

Hereinafter, exemplary embodiments of the present disclosure will be described in detail with reference to the appended drawings. Incidentally, in this specification and the drawings, components having substantially the same functional configuration will be assigned the same reference numerals, and repeated description will be omitted.

Incidentally, the description will proceed in the following order.

1. Overview of present disclosure
2. First Embodiment
2.1. System configuration example 2.2. Functional configuration example of information processing terminal 10
2.3. Functional configuration example of information processing server 20
2.4. Specific examples of teacher data and the student data
2.5. Operation control based on determination result
2.6. Flows of operations of information processing terminal 10 and information processing server 20
3. Second Embodiment
3.1. Overview of second embodiment
3.2. Specific example of label addition request
3.3. Comparison of effects with first embodiment
4. Third Embodiment
4.1. Overview of third embodiment
4.2. Specific example of ambiguous fence setting
5. Hardware configuration example
6. Conclusion

1. OVERVIEW OF PRESENT DISCLOSURE

As described above, in recent years, many techniques of controlling applications or the like on the basis of collected sensor information have been proposed. Here, a fence technique is described as an example of the above techniques. The fence technique refers to all techniques that cause a function corresponding to a set conditions to be ignited when a condition meeting a set predetermined condition is detected. Incidentally, in the present disclosure, the term "ignition" is used as a meaning of starting an operation of a function, that is, activating a function.

For example, the fence technique may include so-called geo-fence. The geo-fence is a technique of setting a designated area in a space and causing a previously set function to be ignited when detecting entering and leaving related to the designated area. Further, the fence technique in abroad sense can include, for example, timer notification, schedule notification, and the like.

FIG. 1 is a diagram for describing an overview of the geo-fence according to the present disclosure. An example of a geo-fence setting screen displayed on a user interface UI of an application is illustrated on a left side of FIG. 1. The user can set a fence F1 by, for example, designating a point P1, a valid radius from the point P1, or the like in a map displayed in the user interface UI. Further, in this case, the user may be able to designate, for example, a function to be ignited in the case of entering the fence F1 or a function to be ignited in the case of leaving the fence F1. In the example of FIG. 1, a case in which, when the user enters the fence F1, a function related to notification transmission is designated to be ignited is illustrated.

After the above settings are performed, if it is detected that a user carrying a device that collects sensor information enters the fence F1, the application can cause a notification n1 set by the user to be displayed on the user interface UI, a home screen H, or the like as illustrated on a right side of FIG. 1.

However, as described above, in many applications, it is difficult to say that detection accuracy (hereinafter also referred to as ignition accuracy) of entering and leaving related to the fence is sufficient. For example, in general applications, in a residential area, there are cases in which correct ignition exceeds erroneous ignition, but in an office area, there are cases in which the erroneous ignition exceeds the correct ignition due to effects of multipaths or the like as described later. Further, the ignition accuracy in the residential area is not sufficient, and there are many cases in which the erroneous ignition exceeds the correct ignition. Further, referring to logs related to ignition output from general applications, it is also possible to confirm that erroneous ignition occurs frequently even in a case where the user stays in the same place.

For example, the ignition accuracy is decreased because positioning information by the GNSS or the like is used for detection of entering and leaving related to the fence. In positioning by the GNSS, positioning accuracy is likely to decrease due to multipath, and it is difficult to say that indoor positioning accuracy is sufficient. Therefore, for example, when the user moves to a window indoors, a phenomenon that the user is erroneously detected to leave the fence is likely to occur frequently. For the above phenomenon, for example, a method of igniting a function when the user moves a predetermined distance after leaving a target building is considered, but in this case, it is possible to prevent a decrease in ignition accuracy, but the immediacy of the function is scarified.

Figure 2:
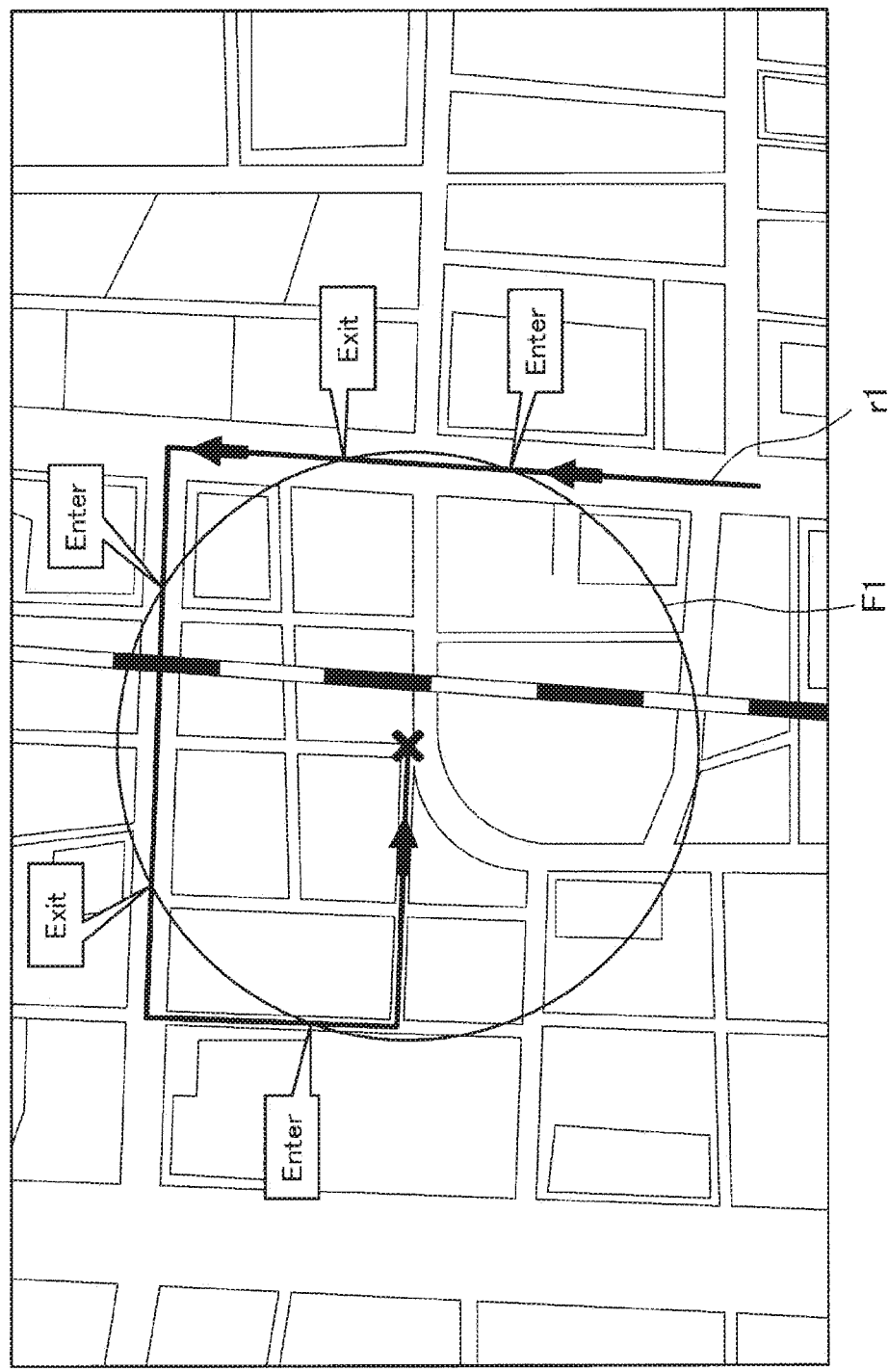
FIG. 2 is a diagram for describing a case in which a user carrying a device that collects sensor information enters and leaves a fence a plurality of times.

Further, even in a case where the positioning accuracy is correct, in a case where the moving route of the user straddles the fence a plurality of times, ignition not desired by the user may be performed. FIG. 2 is a diagram for describing a case in which the user carrying the device that collects sensor information enters and leaves the fence a plurality of times. In FIG. 2, a set fence F1 and a moving route r1 of the user are illustrated. At this time, as illustrated in FIG. 2, the user repeats entering and leaving the fence F1, and in general applications, for example, functions set in associated with entering or leaving are performed a plurality of times, and an operation not desired by the user is likely to be performed.

The present technical spirit was conceived focusing on the prevention of the decrease in the ignition accuracy as described above, and realizes a higher degree of accuracy in connection with the fence. To this end, one of features of the present technical spirit is to perform multimodal learning for each user based on teacher data and the student data collected as sensor information. Further, in the present technical spirit, one of features is to obtain correct answer labels related to entering and leaving the fence efficiently while reducing the burden on the user.

Here, teacher data and the student data according to one embodiment of the present disclosure will be described. The teacher data according to one embodiment of the present disclosure refers to data with high reliability used for generating (estimating) correct answer information used for learning, that is, a label. Here, the label may be binary information such as 0 in a case where the user is in the fence and 1 in a case where the user is out of the fence. On the other hand, the student data according to one embodiment of the present disclosure may be sensor information other than the teacher data. In other words, the student data refers to data with low reliability in connection with generation of the label. In other words, in the present technical spirit, it is possible to cause the student data to be sublimed to data with high reliability in connection with generation of the label by learning the student data using the teacher data with high reliability in connection with generation of the label.

Figure 3:
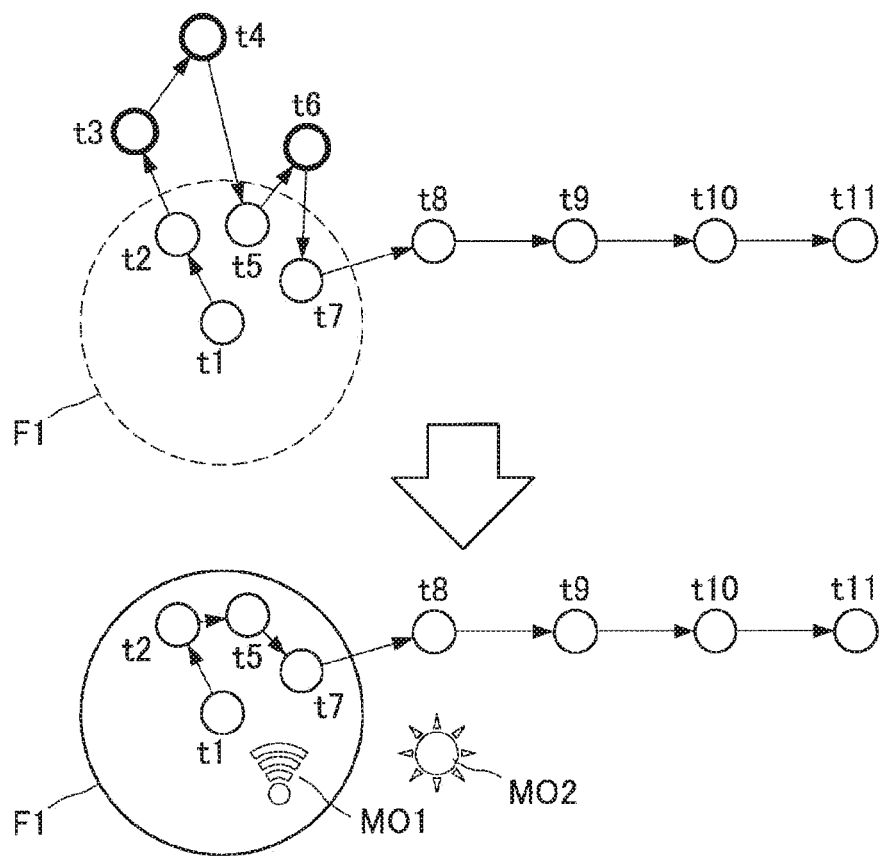
FIG. 3 is a diagram for describing an overview of a technical spirit according to the present disclosure.

FIG. 3 is a diagram for describing an overview of the technical spirit according to the present disclosure. An upper part of FIG. 3 illustrates a mechanism of detecting entering and leaving the fence by a general application. Here, the fence F1 and position information of the user at times t1 to t11 detected as in the related art on the basis of positioning information are illustrated, but as described above, in the general technique, since the sufficient positioning accuracy may not be obtained, it is likely that the erroneous ignition or an ignition not desired by the user occurs at the times t2 to t7.

On the other hand, a lower part of FIG. 3 illustrates a mechanism of detecting entering and leaving the fence according to the present technical spirit. As illustrated in FIG. 3, according to the present technical spirit, noise is removed from measured position information, and thus it is possible to more reliably extract only longitude latitude data obtained at a time at which the user stays in the fence F1 and perform learning more efficiently. More specifically, since the longitude latitude data obtained by the positioning information usually contains a large amount of noise, in the raw state, reliability is low in connection with generation of the label, and it is difficult to use it as the teacher data. On the other hand, the above-described longitude latitude data is filtered on the basis of a chronological signal, general knowledge (rules) that human does not generally enter and leave the fence F1 in units of several seconds, or the like, so that it is possible to extract a time in which the user is out of the fence F1, that is, the label. Incidentally, in the following description, in order to facilitate understanding, data used to extract the label is defined as the teacher data.

Further, for the teacher data above, for example, data to be used in sequential processing at the time of estimation such as longitude latitude data before the above filter process, data obtained from other modals as described later, or the like is defined as the student data.

Incidentally, the modal according to one embodiment of the present disclosure may be various phenomena by which a location, a behavior, a state, or the like of the user can be detected. In FIG. 3, a modal MO1 related to a radio signal such as Wi-Fi (registered trademark) or Bluetooth (registered trademark) and a modal MO2 related to sunlight are illustrated as an example. As described above, in the present technical spirit, sensor information obtained from multiple modals can be used for learning as the teacher data or the student data.

For example, in the present technical spirit, learning related to detection of entering and leaving the fence may be performed using the longitude latitude data from which noise is removed as the teacher data and using the above-described radio signal as the student data. In this case, a label can be added dynamically to a feature extracted from the radio signal on the basis of a label generated from the teacher data, and after learning, there is an immediacy using only the radio signal, and it becomes possible to realize detection of entering and leaving with a high degree of accuracy.

Further, for example, it is possible to perform learning related to detection of entering and leaving the fence using ultraviolet data as the teacher data and using the radio signal as the student data. In this case, a label can be added dynamically to the feature extracted from the radio signal on the basis of the ultraviolet data, and after learning, it is possible to realize detection of entering and leaving using only the radio signal with a high degree of accuracy.

As described above, according to the technical spirit of the present disclosure, it is possible to provide a fence application with a higher ignition accuracy without imposing the burden on the user.

Incidentally, in the above example, the GNSS has been described as an example of the positioning technique, but the positioning technique according to one embodiment of the present disclosure is not limited to such an example. The positioning technique according to one embodiment of the present disclosure may include various techniques which are used outdoors and indoors. Examples of the positioning techniques include satellite positioning related to the GNSS, base station positioning, indoor messaging system (IMES), Wi-Fi positioning, Bluetooth positioning, sonic positioning, visible light positioning, camera image positioning, barometric pressure positioning, geomagnetic positioning, pedestrian dead-reckoning (PDR), and the like.

2. FIRST EMBODIMENT

2.1. System Configuration Example

Figure 4:
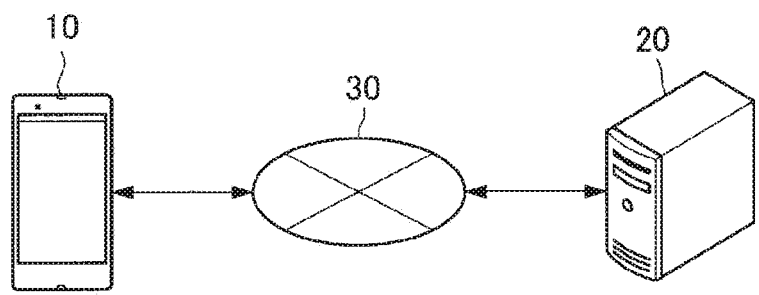
FIG. 4 is a diagram illustrating a system configuration example according to a first embodiment of the present disclosure.

Next, a first embodiment of the present disclosure will be described. FIG. 4 is a diagram illustrating a system configuration example according to the present embodiment. Referring to FIG. 4, the information processing system according to the present embodiment includes an information processing terminal 10 and an information processing server 20. Further, the information processing terminal 10 and the information processing server 20 are connected via a network 30 so that they can communicate with each other.

(Information Processing Terminal 10)

The information processing terminal 10 according to the present embodiment is an information processing device that determines entering and leaving related to the fence on the basis of learning results using the teacher data or the student data and sensor information. Further, the information processing terminal 10 has a function of providing an operation of an application corresponding to the above determination result to the user and a function of collecting the sensor information used as the teacher data or the student data. The information processing terminal 10 according to the present embodiment may be, for example, a smartphone, a tablet, a mobile phone, a wearable device, or the like. Further, the above-described wearable device includes, for example, a head mounted display, a glasses-type device, a wristband-type device, or the like.

(Information Processing Server 20)

The information processing server 20 according to the present embodiment is an information processing device that performs learning based on the sensor information collected by the information processing terminal 10. In other words, the information processing server 20 according to the present embodiment has a function of receiving the teacher data and the student data collected by the information processing terminal 10 and performing learning related to detection of entering and leaving the fence. At this time, the information processing server 20 according to the present embodiment may receive the sensor information from a plurality of information processing terminals 10 and may generate a determinator for each information processing terminal 10.

(Network 30)

The network 30 has a function of connecting the information processing terminal 10 and the information processing server 20. The network 30 may include the Internet, a public network such as a telephone network, a satellite communication network, or various local area networks (LANs) including Ethernet (registered trademark), wide area networks (WANs), or the like. Further, the network 30 may include a dedicated line network such as an Internet protocol-virtual private network (IP-VPN). Further, the network 30 may include a wireless communication network such as Wi-Fi (registered trademark) or Bluetooth (registered trademark).

The system configuration example according to the present embodiment has been described above. Incidentally, the above-described system configuration described with reference to FIG. 4 is merely an example, and the system configuration according to the present embodiment is not limited to the example. For example, two configurations of the information processing terminal 10 and the information processing server 20 are illustrated in the above example, but the functions possessed by the information processing terminal 10 and the information processing server 20 according to the present embodiment may be realized by a single device. For example, the information processing terminal 10 according to the present embodiment may further include a function equivalent to the learning function of the information processing server 20. The system configuration of the present embodiment can be flexibly modified in accordance with a form of an application or characteristics of information to be handled. For example, the function of collecting the sensor information and the function of providing the application may not necessarily be realized by the same terminal, and an application operation such as a notification or the like may be performed by a device (such as a smartphone) different from the information processing terminal 10 or the information processing server 20.

2.2. Functional Configuration Example of Information Processing Terminal 10

Figure 5:
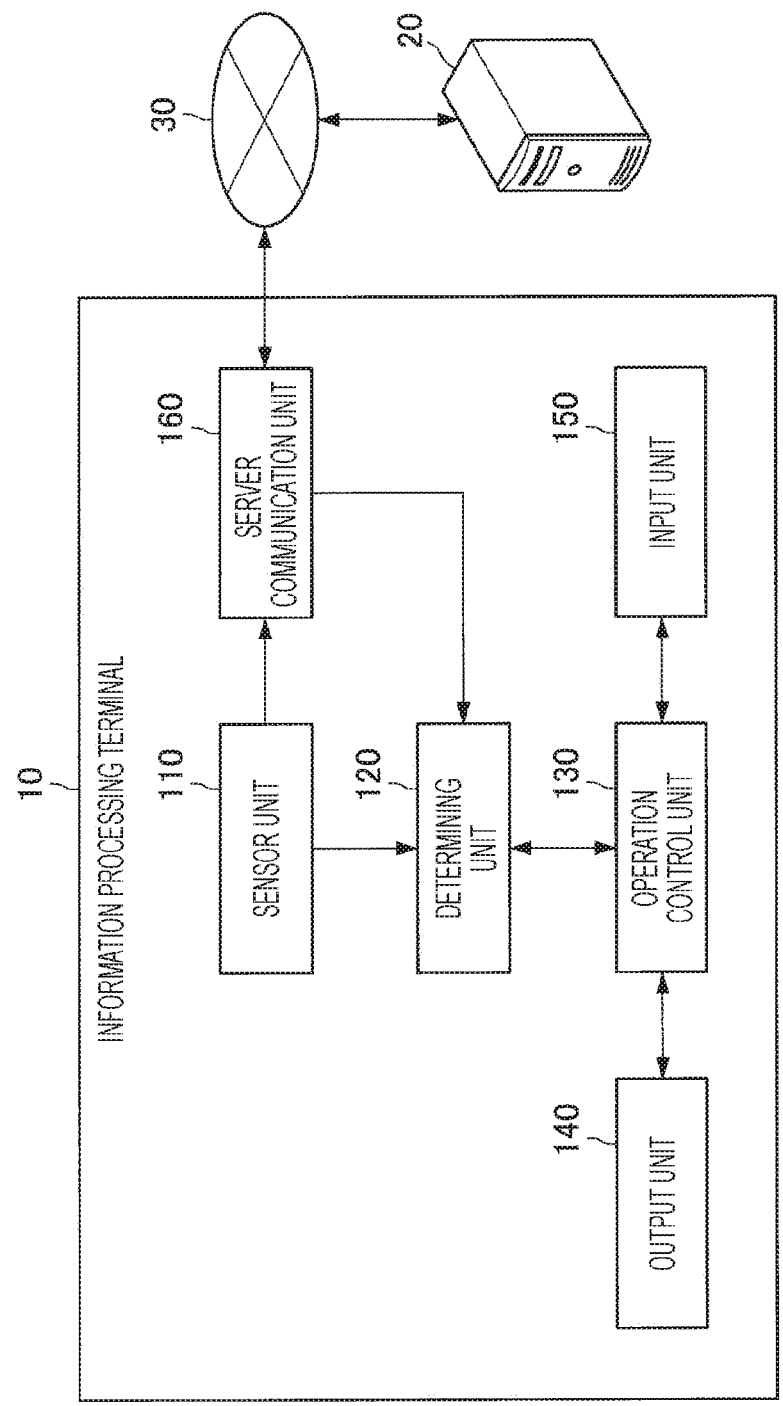
FIG. 5 illustrates an example of a functional block diagram of an information processing terminal according to the embodiment.

Next, a functional configuration example of the information processing terminal 10 according to the present embodiment will be described. FIG. 5 is an example of a functional block diagram of the information processing terminal 10 according to the present embodiment. Referring to FIG. 5, the information processing terminal 10 according to the present embodiment includes a sensor unit 110, a determining unit 120, an operation control unit 130, an output unit 140, an input unit 150, and a server communication unit 160.

(Sensor Unit 110)

The sensor unit 110 has a function of collecting the sensor information. Here, the sensor information according to the present embodiment may include various types of data that can be used as the teacher data or the student data in learning related to entering and leaving the fence.

Examples of the sensor information according to the present embodiment include positioning data by the GNSS, radio signals of Wi-Fi, Bluetooth, Beacon, or the like, ultraviolet data, acoustic data, vibration data, acceleration data, angular velocity data, geomagnetic data, heat data, imaging data, time data, and the like. To this end, the sensor unit 110 according to the present embodiment includes various signal receiving devices, various types of optical sensors including an ultraviolet sensor, a microphone, a vibration sensor, an acceleration sensor, a gyro sensor, a geomagnetic sensor, a thermal sensor, an imaging sensor, a timepiece, and the like. Incidentally, the types of sensors listed above are merely examples, and the sensor unit 110 according to the present embodiment may include sensors other than the above examples.

(Determining Unit 120)

The determining unit 120 has a function of determining entering and leaving related to the designated area, that is, the fence on the basis of the sensor information collected by the sensor unit 110. At this time, the determining unit 120 according to the present embodiment may perform the above determination on the basis of a determinator generated by the information processing server 20. In other words, the determining unit 120 according to the present embodiment can perform determination on the basis of the learning results learned by associating the teacher data related to entering and leaving the fence.

Further, in more detail, the determining unit 120 may perform determination related to entering and leaving the fence on the basis of the learning results learned by associating the teacher data with the student data. At this time, the sensor information used for the determination by the determining unit 120 may be sensor data of the same type as the student data described above.

Incidentally, as described above, the teacher data according to the present embodiment may include the noise-removed longitude latitude data, the ultraviolet data, or the like. Further, as the teacher data according to the present embodiment, for example, a radio signal related to a Wi-Fi access point or the like can be used.

(Operation Control Unit 130)

The operation control unit 130 has a function of controlling an application on the basis of the determination result by the determining unit 120. The operation control unit 130 according to the present embodiment may cause the function of the preset application to be ignited, for example, when the determining unit 120 determines that the information processing terminal 10 enters the fence. Further, the operation control unit 130 according to the present embodiment may perform display control related to a user interface of an application or control based on input information input in the user interface.

(Output Unit 140)

The output unit 140 has a function of outputting a user interface of an application or the like on the basis of the control of the operation control unit 130. To this end, the output unit 140 according to the present embodiment includes a display device that presents visual information. Examples of the display device include a liquid crystal display (LCD) device, an organic light emitting diode (OLED) device, a touch panel, and the like.

Further, the output unit 140 according to the present embodiment has a function of outputting the acoustic information on the basis of the control of the operation control unit 130. The output unit 140, for example, can read a character string by artificial voice or output various types of sound effects provided by an application. To this end, the output unit 140 according to the present embodiment includes an amplifier, a speaker, or the like.

(Input Unit 150)

The input unit 150 has a function of detecting an input operation of the user in the user interface of the application. To this end, the input unit 150 according to the present embodiment includes, for example, a mouse, a keyboard, a controller, a touch panel, various types of buttons, or the like.

Further, the input unit 150 according to the present embodiment may have a voice recognition function of detecting an input by a speech of the user. To this end, the input unit 150 according to the present embodiment includes a microphone or the like.

(Server Communication Unit 160)

The server communication unit 160 has a function of performing information communication with the information processing server 20 via the network 30. Specifically, the server communication unit 160 transmits the sensor information collected by the sensor unit 110 to the information processing server 20. Here, the sensor information may include the teacher data and the student data described above. Further, the server communication unit 160 receives the determinator generated by the information processing server 20.

The functional configuration example of the information processing terminal 10 according to the present embodiment has been described above. Incidentally, the functional configuration described with reference to FIG. 5 is merely an example, and the functional configuration of the information processing terminal 10 according to the present embodiment is not limited to such an example. For example, the information processing terminal 10 may further have a component other than the components illustrated above. As an example, the information processing terminal 10 can be provided with a storage unit that stores the sensor information, the determination results, or the like. Further, as described above, the information processing terminal 10 according to the present embodiment may have a learning function of performing learning related to the determination of the fence. The functional configuration of the information processing terminal 10 according to the present embodiment can be flexibly modified.

2.3. Functional Configuration Example of Information Processing Server 20

Figure 6:
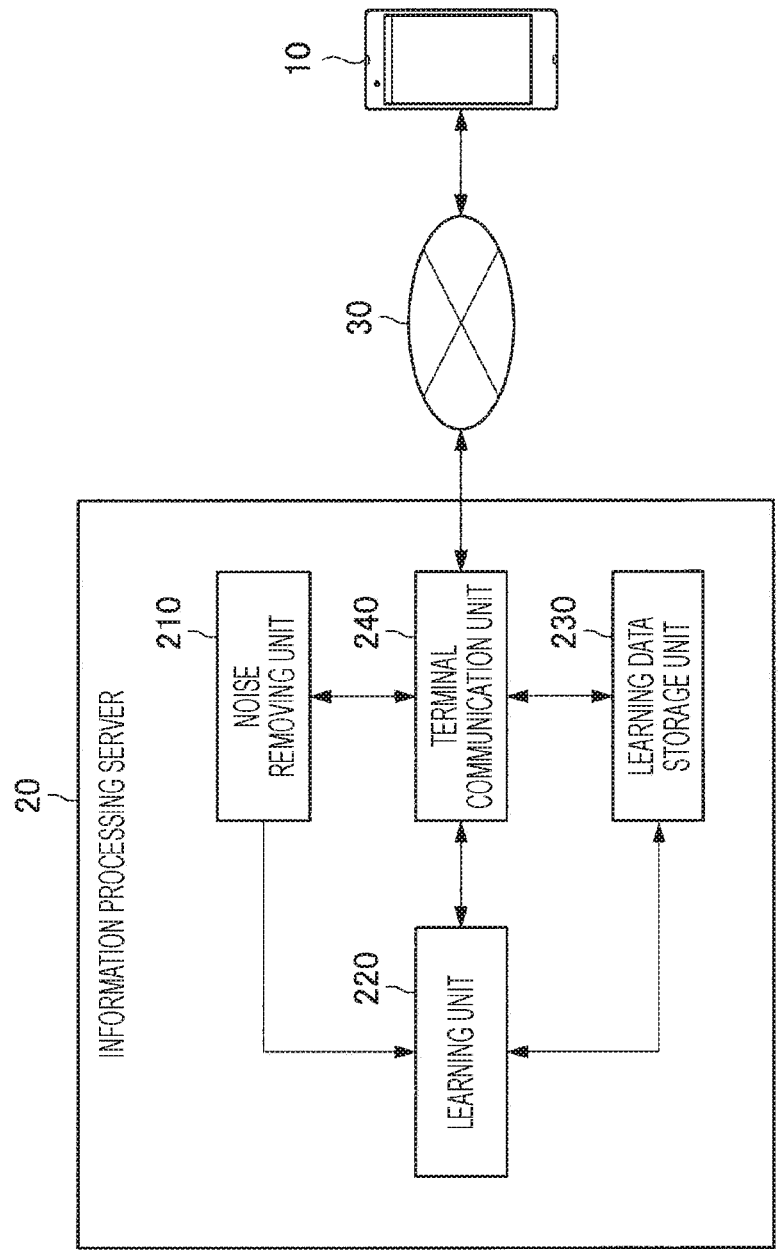
FIG. 6 illustrates an example of a functional block diagram of an information processing server 20 according to the embodiment.

Next, a functional configuration example of the information processing server 20 according to the present embodiment will be described. FIG. 6 is an example of a functional block diagram of the information processing server 20 according to the present embodiment. Referring to FIG. 6, the information processing server 20 according to the present embodiment includes a noise removing unit 210, a learning unit 220, a learning data storage unit 230, and a terminal communication unit 240.

(Noise Removing Unit 210)

The noise removing unit 210 has a function of removing noise contained in the sensor information. The noise removing unit 210 according to the present embodiment may perform noise removal on the longitude latitude data based on, for example, GNSS positioning or the like. At this time, the noise removing unit 210 can remove noise by executing the filtering process described in Patent Document 1. Further, the noise removing unit 210 according to the present embodiment may execute various noise removals corresponding to the type of sensor information in addition to the longitude latitude data. The noise removing unit 210 can perform, for example, low-pass filter processing on frequency data. According to the above-described function of the noise removing unit 210 according to the present embodiment, it is possible to generate a label on the basis of the sensor information with higher reliability, and it is possible to generate a determinator with high accuracy.

(Learning Unit 220)

The learning unit 220 has a function of performing learning related to determination of entering and leaving the fence on the basis of the teacher data and the student data collected by the information processing terminal 10 or the like. According to the learning unit 220 of the present embodiment, it is possible to generate a determinator of each user based on the sensor information collected on the basis of the behavior of the user individual. At this time, as described above, the learning unit 220 may perform learning using, for example, the longitude latitude data from which noise is removed by the noise removing unit 210 as the teacher data and using the radio signal derived from Wi-Fi or the like as the student data.

Further, at this time, the learning unit 220 according to the present embodiment may perform the learning using only the sensor information with high reliability as position information related to the fence. For example, in the case of the longitude latitude data illustrated in the lower part of FIG. 3, the learning unit 220 can perform the learning using longitude latitude data at the times t1 to t5 at which the user is almost certainly estimated to be in the fence F1 and longitude latitude data at the times t10 and t11 at which the user is almost certainly estimated to be out of the fence F1. In other words, the learning unit 220 may perform the learning by excluding the longitude latitude data with low reliability with respect to the determination related to the fence F1 as in the times t6 to t9. According to the above-described function of the learning unit 220, it is possible to automatically generate the label using the teacher data with high certainty, and it is possible to reduce the burden on the user greatly.

Incidentally, the learning unit 220 according to the present embodiment may perform the learning using an algorithm widely used in the field of machine learning. The learning unit 220 can perform, for example, learning by deep learning using a neural network of a multi-layer structure.

(Learning Data Storage Unit 230)

The learning data storage unit 230 has a function of storing various types of data related to the learning by the learning unit 220. The learning data storage unit 230 may store, for example, the teacher data, the student data, the label, various types of learning parameters, and the like.

(Terminal Communication Unit 240)

The terminal communication unit 240 has a function of performing information communication with the information processing terminal 10 via the network 30. Specifically, the terminal communication unit 240 receives the sensor information collected by the information processing terminal 10. Further, the terminal communication unit 240 transmits information related to the determinator generated by the learning unit 220 to the terminal communication unit 240. Further, the terminal communication unit 240 may perform information communication related to feedback, correction, or the like on an ignition timing as described later.

The functional configuration example of the information processing server 20 according to the present embodiment has been described above. Incidentally, the above functional configuration described using FIG. 6 is merely an example, and the functional configuration of the information processing server 20 according to the present embodiment is not limited to such an example. For example, the functions described above may be distributed to and realized by a plurality of devices. Further, as described above, each component of the information processing server 20 can be realized as a function of the information processing terminal 10. The functional configuration of the information processing server 20 according to the present embodiment can be flexibly modified.

2.4. Specific Examples of Teacher Data and the Student Data

Next, the teacher data and the student data pertaining to the present embodiment will be described using specific examples. The information processing server 20 according to the present embodiment can implement efficient student data learning and automatic label generation using the sensor information with high reliability as the teacher data for a fence setting described above.

Therefore, it can be said that the sensor information that can be used for determination almost certainly at the time of collection is suitable for the teacher data according to the present embodiment even though a situation in which collection can be performed is limited. On the other hand, as the student data according to the present embodiment, data that can be collected and used universally and immediately. Further, it is possible to reduce battery consumption and reduce a processing burden related to the determination by using the sensor information that can be collected with low power consumption or the sensor information with a relatively small amount of data as the student data. A combination of the teacher data and the student data used for the learning according to the present embodiment will be described below using a specific example.

(Combination of Longitude Latitude Data and Radio Signal)

As described above, the information processing server 20 according to the present embodiment may perform the learning related to the determination of entering and leaving the fence, for example, using the noise removed longitude latitude data as the teacher data and using the radio signal related to an access point of Wi-Fi or the like as the student data.

Figure 7:
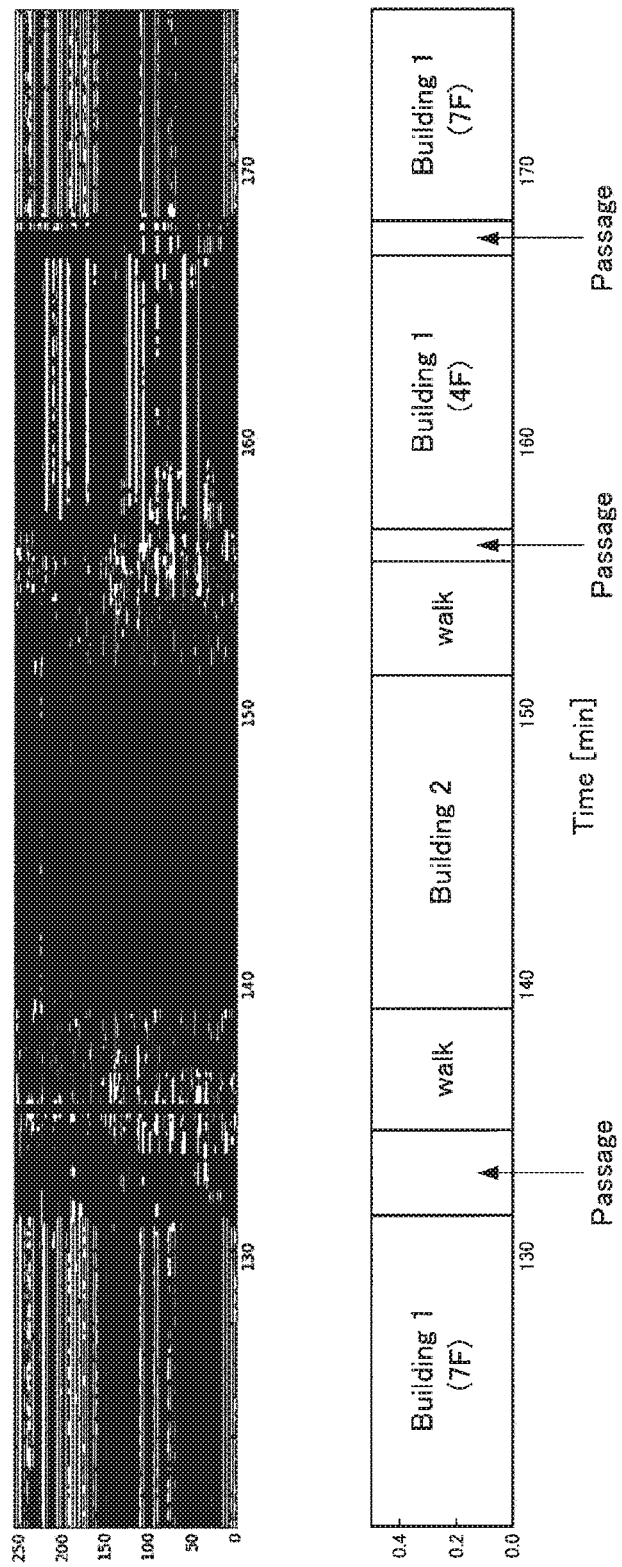
FIG. 7 is a diagram illustrating an example of a detection pattern of a radio signal and a correct answer label for the detection pattern according to the embodiment.

FIG. 7 is a diagram illustrating an example of a detection pattern of the radio signal according to the present embodiment and a correct answer label for the detection pattern. FIG. 7 illustrates the detection pattern related to the access point of Wi-Fi and the correct answer labels such as Building 1 and Building 2 and Building 1 set as the fence, Passage in Building 1, and Walk indicating moving. As described above, the radio signal related to the access point of Wi-Fi exhibits different characteristics depending on a location and can be collected universally. Therefore, in the learning according to the present embodiment, it is possible to generate indoor/outdoor determinators related to Building 1 or the like by training the radio signal with the noise-removed longitude latitude data, and it is possible to realize determination with high accuracy not depending on a status of a satellite.

(Combination of Ultraviolet Data and Radio Signal)

Further, the information processing server 20 according to the present embodiment performs the learning related to the determination of entering and leaving the fence, for example, using the ultraviolet data as the teacher data and using the radio signal related to the access point of Wi-Fi or the like as the student data.

Figure 8:
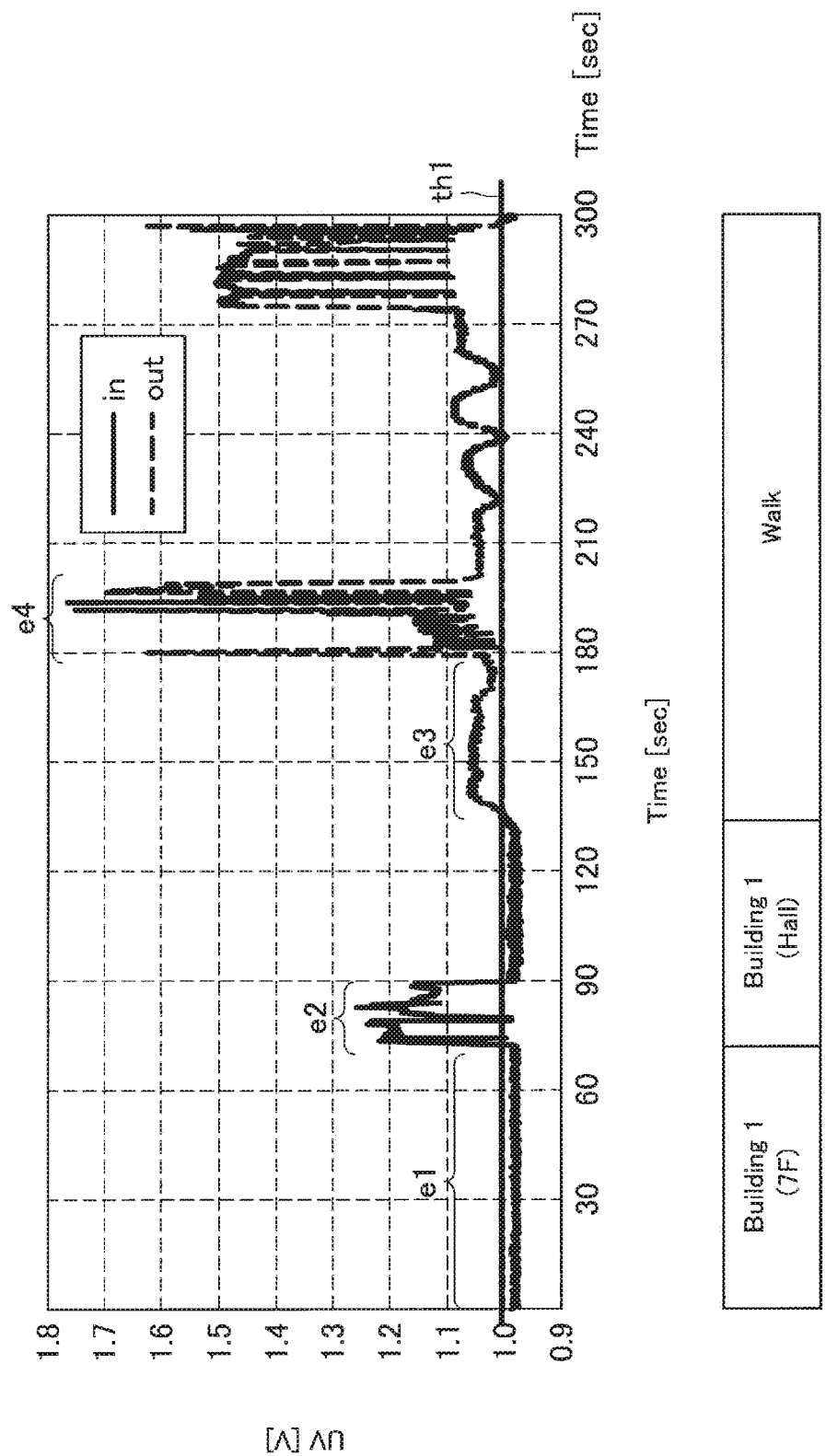
FIG. 8 is a diagram illustrating an example of ultraviolet data used for teacher data according to the embodiment.

FIG. 8 is a diagram illustrating an example of the ultraviolet data used for the teacher data of the present embodiment. In FIG. 8, the intensity of the ultraviolet data collected by the information processing terminal 10 is illustrated along with a time axis.

Here, e1 in FIG. 8 indicates ultraviolet data collected in 7F of Building 1. Further, e2 indicates ultraviolet data collected when it is exposed to sunlight in the hall of Building 1. Further, e3 indicates ultraviolet data collected when it moves in a shaded place the building 1 after leaving the building. Further, e4 indicates ultraviolet data collected in a sunny place.

As described above, the ultraviolet data is limited sensor information which is unable to be collected at night or the like, but the ultraviolet data is one of sensor information suitable for indoor/outdoor determination in the clear weather as indicated by a line th1 in FIG. 8. Further, near-ultraviolet light is classified into UV-A, UV-B, and UV-C depending on a length of a wavelength, but among these, only UV-A and UV-B reach the ground. Among these, UV-B has a characteristic that it is difficult to pass through glass because the wavelength is short. For this reason, in the present embodiment, it is possible to perform indoor/outdoor determination with higher accuracy by using only UV-B as the teacher data.

(Other Teacher Data Examples)

Although the specific examples of the combination of the teacher data and the student data according to the present embodiment have been described above, the teacher data according to the present embodiment is not limited to the above-described combinations. Various types of sensor information can be used as the teacher data according to the present embodiment.

For example, in a case where the information processing terminal 10 is a wearable device or the like, target door recognition may be performed on the basis of an image acquired by an imaging sensor and an image of a door used for entering and leaving the fence captured by the user in advance, and a recognition result may be used as the teacher data.

Further, the teacher data according to the present embodiment may be sensor information collected from a device installed in a door used for entering and leaving the fence. For example, entering and leaving the fence determined by a combination of a sensor log related to opening and closing of a door sensed on the basis of entering and leaving of an unidentified person such as a surveillance camera or a smart lock and door passing of a possessed user estimated on the basis of the sensor information collected by the information processing terminal 10 may be used as the teacher data. Further, the above determination can also be performed by reading a tag with a door and the information processing terminal 10 or the like.

Further, the teacher data may be information which is explicitly input by the user. For example, information input related to fence determination is encouraged by, for example, "please tap a button to open a door in a tutorial of a game application or the like, obtained information may be used as the teacher data. Further, at this time, an effect of improving information collection efficiency by providing the user with incentives or the like corresponding to an application is also expected.

Further, for example, motion data collected from a motion sensor installed in a shoe or the like of the user may be used as the teacher data. In this case, for example, in a case where it is detected that the user wears the shoes, it is determined that the user leaves the fence such as Home, and in a case where it is detected that the user takes off the shoes in the same day, it can be determined that the user enters the fence. Further, in a case where the shoe is a shoe whose purpose is limited such as trekking shoes, for example, it is possible to detect an event corresponding to the purpose.

Further, the sensor information collected from items other than the shoes may be used as the teacher data. As an example, it may be detected that the user takes out the umbrella or performs opening and closing operations or the like on the basis of sensor information collected from an umbrella. Further, it is possible to determine leaving the fence by detecting that a collar, a lead, or the like is attached to a pet such as an indoor dog or determine entering the fence by detecting that a collar or a lead is removed.

(Other Student Data Examples)

Further, the student data according to the present embodiment is not limited to the above-described radio signal, similarly to the teacher data. As the student data according to the present embodiment, for example, motion data of an acceleration sensor or the like collected from a motion sensor may be used. The sensor signal includes, for example, a feature of an individual-specific motion related to an operation of opening and closing the door. The individual-specific motion includes, for example, a series of actions such as an action of pushing a door, an action of opening a door, an action of picking a key, and an action of locking a key.

Further, atmospheric pressure data may be used as the student data according to the present embodiment. Since the atmospheric pressure differs between indoors and outdoors, it can be used as effective student data especially in a house or the like with high airtightness.

Further, illuminance data may be used as the student data according to the present embodiment. Although the illuminance is affected by a time zone, in most cases, the illuminance is assumed to differ between indoors and outdoors.

Further, carbon dioxide concentration data may be used as the student data according to the present embodiment. For example, different carbon dioxide concentrations are detected between outdoors and indoors in which airtightness is high and there are many people.

Further, infrared data may be used as the student data according to the present embodiment. The amount of dust present in the air differs between outdoors and indoors in which air cleaning is performed. Therefore, it can be used for indoor/outdoor determination by detecting diffuse reflection of infrared rays by dust.

Further, it is also possible to use the satellite signal acquired by the GNSS as the student data. In positioning by the GNSS, it is necessary to receive signals from multiple satellites and to have sufficient signal strength. However, it is possible to use even only information that only a signal from a single satellite is received as the student data in a case where the positions of the satellites can be detected. In this case, for example, in a case where a satellite is detected in a predetermined direction range and an elevation angle range, it can be determined that the location is X or the like.

Other Modified Examples

The teacher data and the student data according to the present embodiment have been described above using the specific examples. On the other hand, the learning using the teacher data and the student data according to the present embodiment can be variously modified.

For example, only the student data collected from a plurality of information processing terminals 10 may be used for the learning according to the present embodiment. For example, the information processing server 20 according to the present embodiment may perform final determination by decision by a majority by collecting a plurality of determination results based on the student data collected from the information processing terminal 10. Further, the information processing server 20 according to the present embodiment can also generate the label using the student data collected from a plurality of the information processing terminals 10 as group information.

Figure 9:
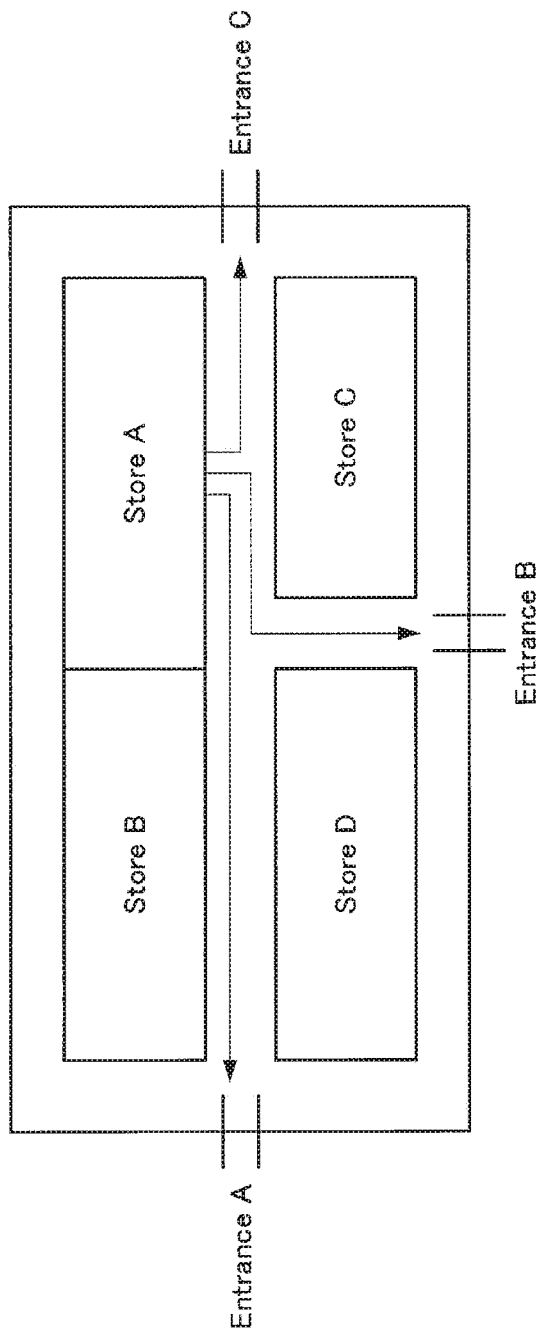
FIG. 9 is a diagram for describing learning based on a plurality of pieces of student data according to the embodiment.

FIG. 9 is a diagram for describing learning based on a plurality of pieces of student data according to the present embodiment. For example, FIG. 9 illustrates a plurality of stores A to D and surrounding routes in the premises such as a station, and a route of a user who left the store A. At this time, the route of the user after leaving the store varies depending on the user, but it is expected to specify the exit of entrances A to C by overlapping a large number of radio signal detection patterns or the like collected from the information processing terminal 10 carried by a plurality of users. Further, for example, in a dome, a concert hall, or the like, a point in which a plurality of detected moving routes is aggregated may be estimated to be the exit.

Further, in the present embodiment, the sufficiently trained student data may be promoted to the teacher data. In this case, the information processing server 20 can also calculate a learning proficiency level and use it as a criterion for promotion. According to the above functions, for example, effects that the sensor information of low power consumption is as the teacher data or the number of combinations of the teacher data and the student data is significantly increased are expected.

Further, as the teacher data and the student data according to the present embodiment, the sensor information collected by the information processing terminal 10 carried by other users may be used together in addition to the sensor information collected by the information processing terminal 10 carried by the user him/herself. For example, in the case of the fence related to Home, a family of a target user or the like is assumed as the other users. Further, in the case of the fence related to a workplace, the sensor information collected by the information processing terminal 10 carried by colleagues of a handling user may be used. According to this function, a large amount of data can be collected efficiently, and more effective learning can be performed.

2.5. Operation Control Based on Determination Result

Next, operation control based on the determination result of the present embodiment will be described. As described above, the operation control unit 130 of the information processing terminal 10 according to the present embodiment can ignite functions of various applications on the basis of the determination result by the determining unit 120. Examples of functions controlled by the operation control unit 130 according to the present embodiment will be described below.

The operation control unit 130 according to the present embodiment can, for example, cause a function related to information notification to be ignited in a case where entering and leaving related to the fence are determined. Examples of the information notification include transmission of weather or traffic information, news, or the like, an announcement for taking out garbage corresponding to a collection date, or a message such as encouragement from an agent. Further, the information notification may be performed for users other than the target user. For example, in a case where the target user leaves a workplace, the operation control unit 130 can also give a notification indicating that the target user has left the workplace to a family member, a colleague, a user registered in a schedule, or the like. According to this function, for example, even in a case where the target user comes later than a start time of a meeting or the like, it is possible to automatically transmit a situation to other users. Further, the operation control unit 130 may, for example, perform immediate music reproduction or the like when leaving the workplace is detected. Further, the operation control unit 130 can also control seamless music reproduction on the basis of detection of moving between rooms.

Further, the operation control unit 130 may perform control such that various types of settings related to the information processing terminal 10 or the application are changed when entering and leaving related to the fence are determined. For example, in a case where entering home is determined, control of turning off some functions of a behavior recognition application (for example, boarding detection or the like). Further, the operation control unit 130 may change settings of affecting power consumption such as brightness settings in accordance with entering and leaving the fence. Further, in a case where entering home is determined, the operation control unit 130 may cause a message such as "Update is recommended if it is not used for a while" and encourage the user to update a system or an application. Further, in a case where leaving home is determined, the operation control unit 130 may cause the information processing terminal 10 to transition to a commuting mode.

Further, the operation control unit 130 may also control devices other than the information processing terminal 10. For example, in a case where leaving home is determined, the operation control unit 130 can control an elevator of an apartment such that it is moved to a floor on which the home of the user is located. Further, the operation control unit 130 may automatically lock a door key in a case where leaving home is determined. Further, the operation control unit 130 can perform automatic stamping or the like in cooperation with a leaving management system or the like on the basis of determination of entering and leaving related to a workplace.

The examples of operation control according to the present embodiment have been described above. As described above, according to the information processing terminal 10 and the information processing server 20 of the present embodiment, it is possible to cause various functions to be ignited on the basis of determination of entering and leaving related to the fence.

On the other hand, a desired initiation timing is assumed to differ depending on a characteristic of a function or a preference of the user even in a case where entering and leaving the fence are correctly determined. For example, for music reproduction, there are those who want to reproduce music immediately after leaving home, and for notification of news, there are those who are unable to check it even though it is notified of when the user is locking a door immediately after leaving home.

Therefore, the information processing server 20 according to the present embodiment may request the user to give feedback on the ignition timing of the function, perform learning based on the feedback, and cause the function to be ignited at a more desirable timing for the user. In other words, the operation control unit 130 according to the present embodiment may control an application on the basis of a learning result learned on the basis of feedback on an operation timing of the application.

Figure 10:
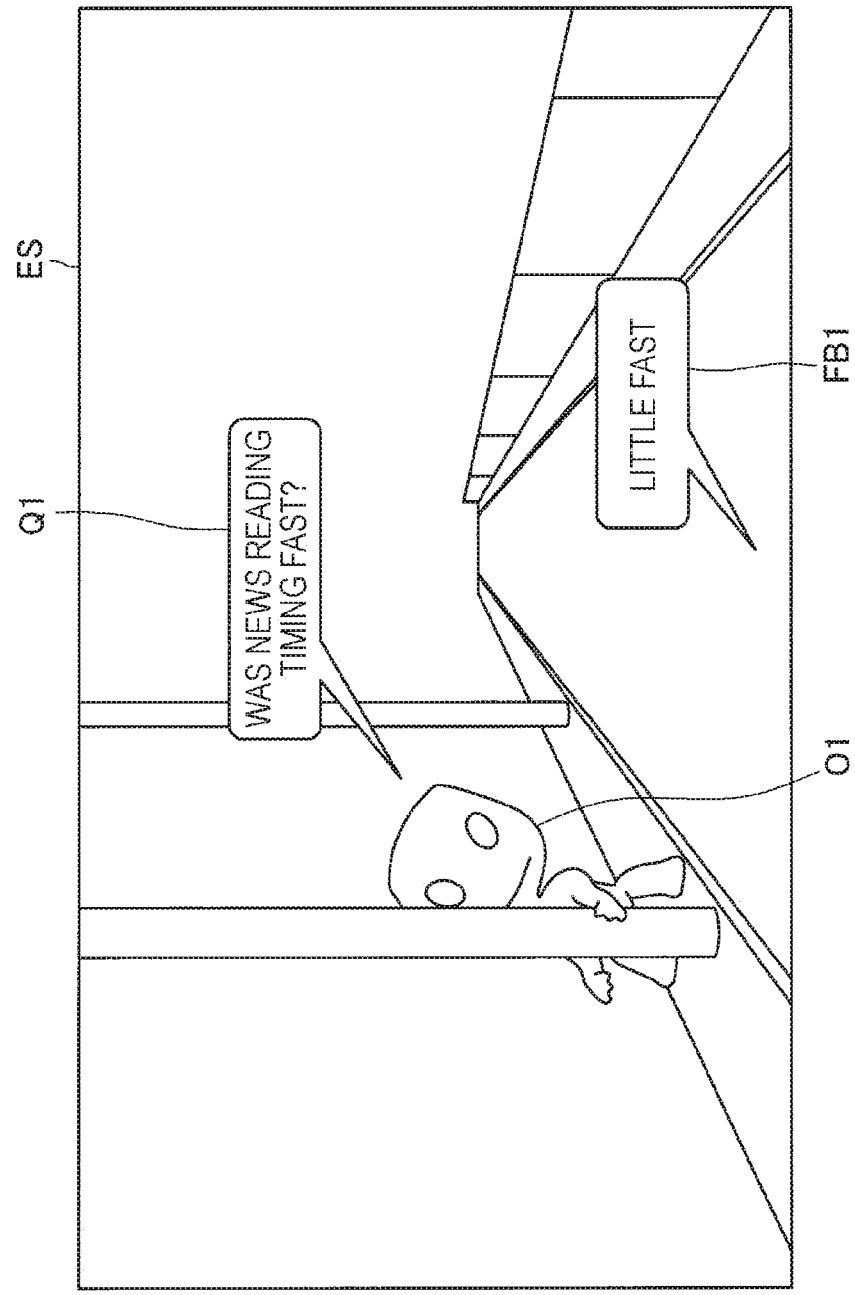
FIG. 10 is a diagram illustrating an example of output control related to a feedback request of the embodiment.

Further, the operation control unit 130 according to the present embodiment may control an output related to the above feedback request. FIG. 10 is a diagram illustrating an example of output control related to the feedback request according to the present embodiment. In FIG. 10, a field of view ES of the user and an object O1 and a request message Q1 displayed on the output unit 140 of the information processing terminal 10 which is a head mounted display or a glasses-type wearable device are illustrated.

Here, the object O1 may be, for example, a character for assisting the user set in an application. Further, the request message Q1 may be content for requesting feedback on an ignition timing of a news reading function ignited on the basis of the fence determination. Incidentally, the request message Q1 may be output as visual information or may be output as audio information. For example, the user may check the request message Q1 and input a feedback FB illustrated in FIG. 10 by voice or the like. Incidentally, although FIG. 10 illustrates a case in which the information processing terminal 10 is a wearable device, for example, in a case where the information processing terminal 10 is a smartphone or the like, the feedback FB can similarly be acquired by outputting the request message Q1 as voice information.

Figure 11:
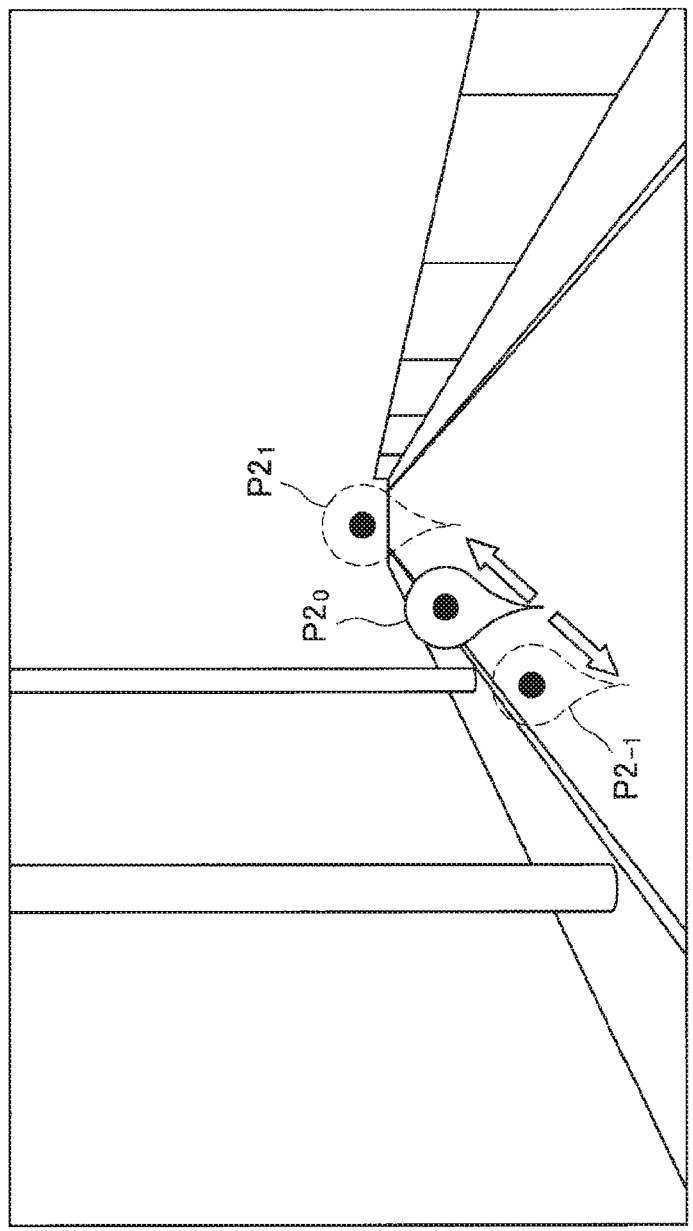
FIG. 11 is a diagram illustrating another example of feedback according to the embodiment.

Further, FIG. 11 is a diagram illustrating another example of feedback according to the present embodiment. In FIG. 11, a pin type request object $P2_0$ displayed on the output unit 140 of the information processing terminal 10 which is a wearable device is illustrated. Here, the pin type request object $P2_0$ may indicate, for example, a previous ignition timing of the function.

At this time, the user can adjust the ignition timing by moving the pin type request object $P2_0$. For example, in a case where the pin type request object $P2_0$ is related to a function which is ignited on the basis of leaving home, the user may give feedback indicating the ignition timing is late by moving the pin type request object $P2_0$ to a state of $P2_{-1}$ closer to home. Further, the user may give feedback indicating that the ignition timing is fast by moving the pin type request object $P2_0$ to a state of $P2_1$ further away from home.

Incidentally, although FIG. 10 illustrates a case in which the information processing terminal 10 is a wearable device, for example, in a case where the information processing terminal 10 is a smartphone or the like, the feedback can similarly be acquired by displaying the pin type request object $P2_O$ on a map application.

Further, the feedback according to the present embodiment need not necessarily be information which is explicitly input by the user. For example, the operation control unit 130 may automatically generate feedback indicating that the ignition timing is fast when the read news is immediately stopped by the user. Further, the operation control unit 130 may generate feedback after obtaining confirmation of the user in a case where the above process is performed.

Next, relearning of the ignition timing based on feedback according to the present embodiment will be described. Here, some configuration patterns can be applied to the relearning of the ignition timing. FIGS. 12A to 12D are diagrams illustrating examples of a configuration pattern related to the relearning of the ignition timing of the present embodiment.

Figure 12A:
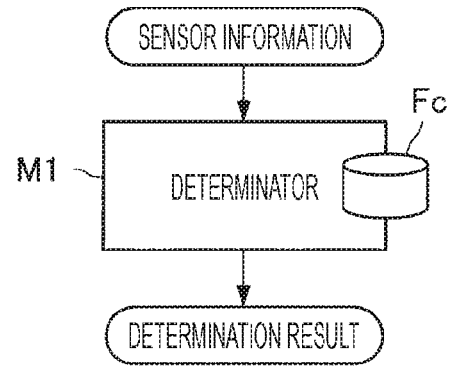
FIG. 12A is a diagram illustrating an example of a configuration pattern related to relearning of an ignition timing of the embodiment.
Figure 12B:
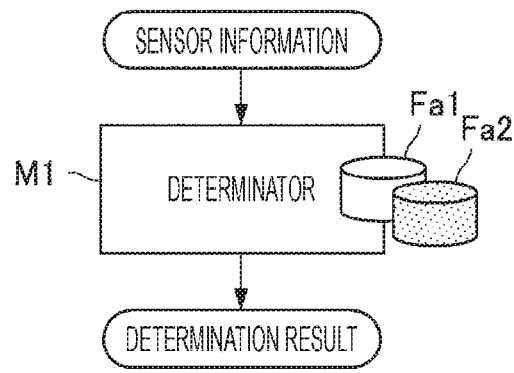
FIG. 12B is a diagram illustrating an example of a configuration pattern related to relearning of an ignition timing of the embodiment.

For example, the learning unit 220 according to the present embodiment may cause a constructed determinator M1 to be relearned on the basis of the acquired feedback. FIGS. 12A and 12B illustrate configuration patterns in a case where the learning unit 220 causes the constructed determinator M1 to be relearned.

At this time, as illustrated in FIG. 12A, the learning unit 220 may perform the relearning related to the ignition timing using feedback information Fc common to all applications. In other words, the learning unit 220 can use the feedback information acquired by each application for adjustment of the ignition timing in all the applications.

On the other hand, as illustrated in FIG. 12B, the learning unit 220 may perform relearning related to the ignition timing using feedback information Fa specific to an individual application. In other words, the learning unit 220 may use feedback information obtained by an individual application only for adjustment of an ignition timing of an acquisition source application. According to this configuration, it is possible to perform fine adjustments corresponding to the preference of the user of each application. Incidentally, at this time, the determinator M1 can perform determination corresponding to each application by loading a parameter onto each application.

Incidentally, in a case where the determinator M1 is relearned as illustrated in FIGS. 12A and 12B, the learning unit 220 may estimate an optimum ignition timing in accordance with content of feedback and automatically generate the label corresponding to the estimation. FIG. 13 is a diagram illustrating a specific example of label generation in a case where the determinator M1 according to the present embodiment is relearned. FIG. 13 illustrates feedback on leaving from home and a method of generating a label corresponding to the feedback.

For example, in a case where feedback indicates that the ignition timing is fast, the learning unit 220 may estimate that the optimum ignition timing is later than the current ignition timing. At this time, the learning unit 220 may generate a label in which up to a timing after T[s] from the current ignition timing is set as home.

Further, for example, in a case where feedback indicates that the ignition timing is late, the learning unit 220 may estimate that the optimal ignition timing precedes the current ignition timing. At this time, the learning unit 220 may generate a label in which up to a timing before T[s] from the current ignition timing is set as home.

Further, for example, in a case where feedback indicates that there is no problem, the learning unit 220 may estimate that the optimal ignition timing is the current ignition timing. At this time, the learning unit 220 may use the present ignition result as the teacher data without correcting it.

Further, for example, in a case where feedback is not indicated, the learning unit 220 may not perform the estimation by the optimal ignition timing. At this time, the learning unit 220 may not use the current data as the teacher data.

Incidentally, as T[s] in FIG. 13, initially, a preset value such as 5 seconds may be used, and the value may be changed in accordance with the number of relearnings. Further, for example, as illustrated in FIG. 10, in a case where the feedback includes content indicating a degree such as "small", "very", "little", or the like, the learning unit 220 may also adjust T[s] on the basis of the degree estimated from the content.

Figure 12C:
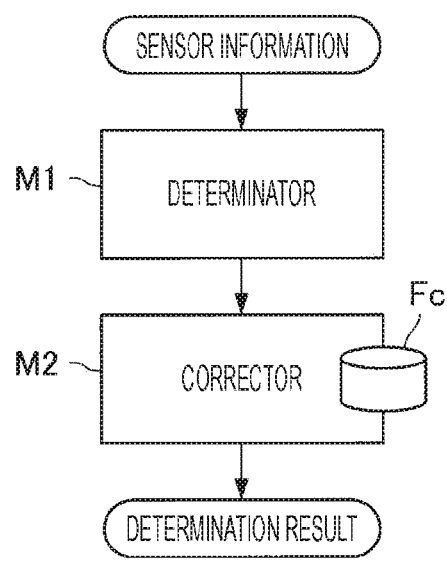
FIG. 12C is a diagram illustrating an example of a configuration pattern related to relearning of an ignition timing of the embodiment.
Figure 12D:
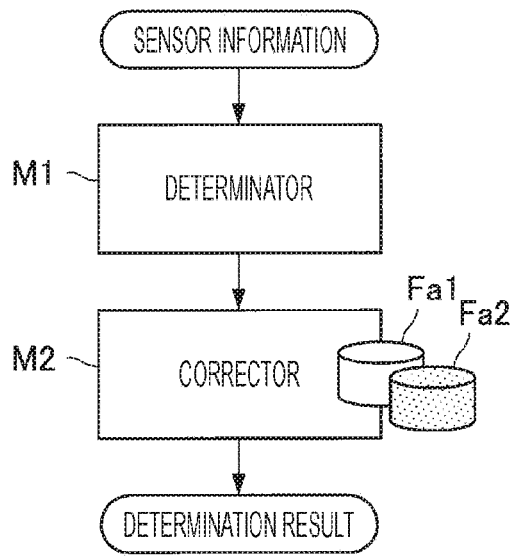
FIG. 12D is a diagram illustrating an example of a configuration pattern related to relearning of the ignition timing of the embodiment.

Further, for example, the learning unit 220 according to the present embodiment may generate a corrector M2 that adjusts the ignition timing, separately from the constructed determinator M1. FIGS. 12C and 12D illustrate configuration patterns in a case where the learning unit 220 generates the corrector M2.

At this time, as illustrated in FIG. 12C, the learning unit 220 may generate the corrector M2 using the feedback information Fc common to all the applications. According to this configuration, an effect that the ignition timing adjustment effect appears quickly is expected.

Further, as illustrated in FIG. 12D, the learning unit 220 may generate a corrector M2 using the feedback information Fa specific to an individual application. According to this configuration, similarly to the configuration illustrated in FIG. 12C, an effect that the ignition timing adjustment effect appears quickly is expected, and it is possible to perform fine adjustment for each application. Further, in a case where it is necessary to adjust the ignition timing depending only on a characteristic of an application, it is also possible to obtain an advantage that the feedback information Fa or the corrector M2 can be shared and commonalized among the users.

Incidentally, in a case where the corrector M2 is generated separately from the determinator M1 as illustrated in FIG. 12C and FIG. 12D, the learning unit 220 can correct the ignition timing using a correction value table. FIG. 14 illustrates an example of the correction value table according to the present embodiment. In FIG. 14, correction values of the ignition timing with respect to entering or leaving for each place are illustrated. Incidentally, FIG. 14 is an example in a case where the ignition timing is delayed. At this time, the value of T[s] used for correction may be a fixed value or may vary depending on the number of times, similarly to the above example, and it may be set on the basis of the content indicating the degree included in the feedback.

Further, in a case where the correction of the ignition timing depends on a characteristic of the application, the correction value table illustrated in FIG. 14 may be shared among family members, colleagues, or the like. Further, attribute information may be added to a location, and a common model may be generated for each attribute. The attributes include, for example, home, a workplace, a store, and the like. Further, for example, in a case where a new application is installed, it is also possible to employ, as an initial value, the correction value table generated by an application similar to the application, an average of the correction value table of all the applications.

The configuration patterns related to the relearning based on the feedback of the present embodiment have been described above. Incidentally, even in a case where any of the patterns described above is used, the learning algorithm is not significantly affected, and the ignition timing can be adjusted in accordance with the feedback for each location.

2.6. Flows of Operations of Information Processing Terminal 10 and Information Processing Server 20

Figure 15:
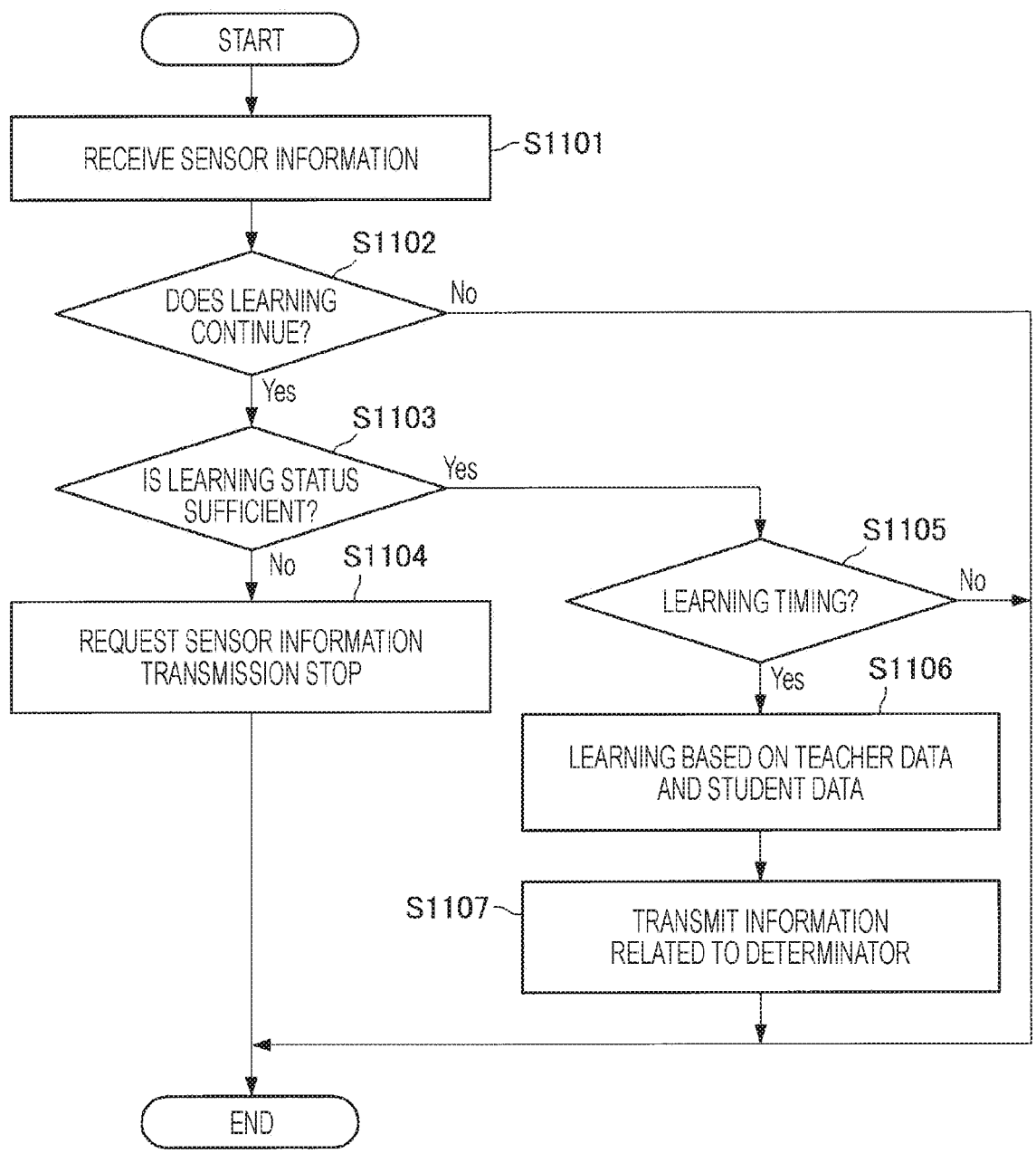
FIG. 15 is a flowchart illustrating a flow of an operation of an information processing server according to the embodiment.

Next, flows of operations of the information processing terminal 10 and the information processing server 20 according to the present embodiment will be described. First, a flow of an operation of the information processing server 20 related to the learning will be described. FIG. 15 is a flowchart illustrating a flow of an operation of the information processing server 20 according to the present embodiment.

Referring to FIG. 15, first, the terminal communication unit 240 of the information processing server 20 receives the sensor information from the information processing terminal 10 (S1101). Here, the sensor information may include the teacher data and the student data as described above.

Then, the learning unit 220 determines whether or not the learning continues (S1102). The determination may be performed on the basis of, for example, a continuation setting by the user.

Here, in a case where it is determined that the learning unit 220 does not continue the learning (No in S1102), the information processing server 20 ends the learning process related to the determination of entering and leaving the fence.

On the other hand, in a case where it is determined that the learning unit 220 continues the learning (Yes in S1102), the learning unit 220 then determines whether or not a learning status is sufficient (S1103). The determination may be performed, for example, on the basis of an output such as a cost by a determinator or may be performed on the basis of determination or the like based on the student data. Further, the determination may be performed on the basis of the number of learnings or the like.

Here, in a case where the learning unit 220 determines that the learning status is sufficient (Yes in S1103), the learning unit 220 then causes the information processing terminal 10 to transmit a signal for requesting that the transmission of the sensor information be stopped (S1104), and the information processing server 20 ends a series of processes.

On the other hand, in a case where the learning unit 220 determines that the learning status is not sufficient (No in S1103), the learning unit 220 then determines whether or not it is a learning timing (S1105). The determination may be performed on the basis of, for example, a time zone set in advance.

Here, in a case where the learning unit 220 determines that it is the learning timing (Yes in S1103), the learning unit 220 then executes the learning based on the teacher data and the student data received in step S1101 (S1106). Incidentally, the teacher data used in step S1106 may undergo the noise removal process by the noise removing unit 210.

Then, the terminal communication unit 240 transmits information related to the determinator generated in step S1106 to the information processing terminal 10 (S1107), and the information processing server 20 ends a series of processes related to the learning.

Figure 16:
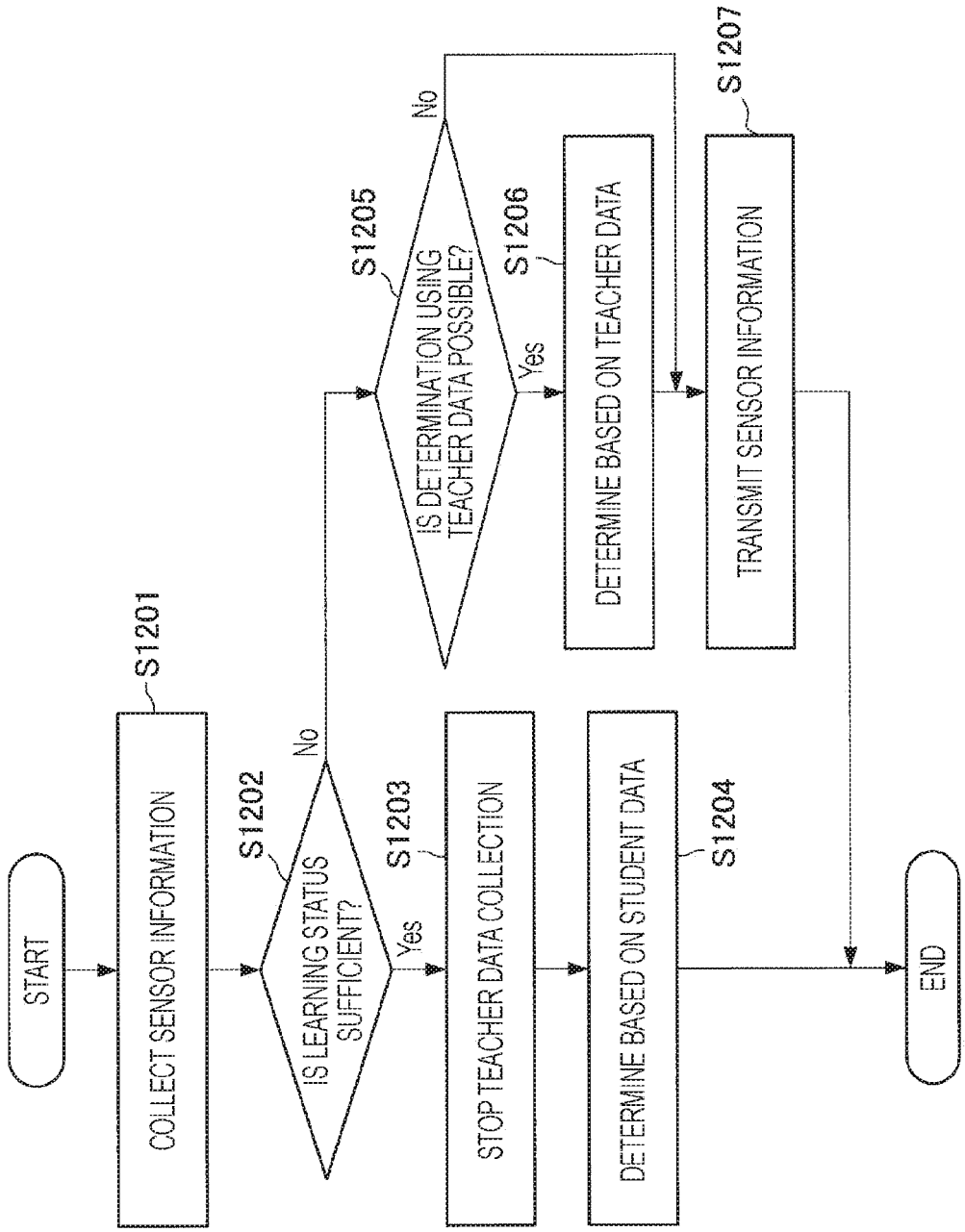
FIG. 16 is a flow chart illustrating a flow of operation of an information processing terminal in determination of entering and leaving a fence according to the embodiment.

Next, a flow of an operation of the information processing terminal 10 in the determination of entering and leaving the fence will be described. FIG. 16 is a flow chart illustrating a flow of an operation of the information processing terminal 10 in the determination of entering and leaving the fence according to the present embodiment.

Referring to FIG. 16, first, the sensor unit 110 of the information processing terminal 10 collects the sensor information (S1201). Incidentally, the sensor information may include the teacher data and the student data.

Then, the determining unit 120 determines whether or not the learning status of the student data is sufficient (S1202). Here, in a case where the determining unit 120 determines that the learning status of the student data is sufficient (Yes in S1202), the determining unit 120 then stops the collection of the teacher data by the sensor unit 110 (S1203). This process is effective particularly when, for example, the teacher data is data with high power consumption such as imaging data. On the other hand, for example, since the longitude latitude data can also be used as the student data, the sensor information that can be used as both the teacher data and the student data may be sequentially collected as long as it is necessary as the student data.

Then, the determining unit 120 performs determination based on the student data (S1204), and the information processing terminal 10 ends a series of processes related to the determination.

On the other hand, in a case where the determining unit 120 determines that the learning status of the student data is not sufficient (No in S1202), the determining unit 120 then determines whether or not determination based on the teacher data is possible (S1205). Here, in a case where it is determined that the determination based on the teacher data is not possible (No in S1205), the determining unit 120 may skip the determination process based on the teacher data. In other words, the determining unit 120 determines whether or not the teacher data sufficient for performing the determination is accumulated, and in a case where the teacher data is not sufficiently accumulated, for example, in the first day of learning or the like, control may be performed such that determination with low accuracy is not performed.

On the other hand, in a case where it is determined that the determination by the teacher data is possible (Yes in S1205), the determining unit 120 performs determination based on the teacher data (S1206) and then transmits the sensor information collected in step S1201 to the information processing server 20 (S1207) in order to perform further learning.

The flows of the operations of the information processing terminal 10 and the information processing server 20 according to the present embodiment have been described above. Incidentally, the flows described with reference to FIGS. 15 and 16 are only the basic forms, and the operations of the information processing terminal 10 and the information processing server 20 according to the present embodiment can flexibly be modified depending on content described in the present disclosure or the application expected from the content.

3. SECOND EMBODIMENT

3.1. Overview of Second Embodiment

Next, a second embodiment of the present disclosure will be described. In the first embodiment described above, a case in which the learning unit 220 automatically generates the label by using only the sensor information with high reliability as the position information related to the fence. On the other hand, in the second embodiment according to the present disclosure, the sensor information with low reliability may be used for learning as the position information related to the fence. For example, in the case of the longitude latitude data illustrated in the lower part of FIG. 3, the learning unit 220 can also use the longitude latitude data of the times t7 to 9 in which the user is unable to be reliably regarded being within the fence F1 together for the learning.

However, in this case, it is difficult to automatically generate the label for the data with low reliability as the position information related to the fence as in the first embodiment. For this reason, in the second embodiment of the present disclosure, it is possible to determine the necessity of labeling from data distribution generated on the basis of feature values extracted from the sensor information and request the user to add the label.

Figure 17:
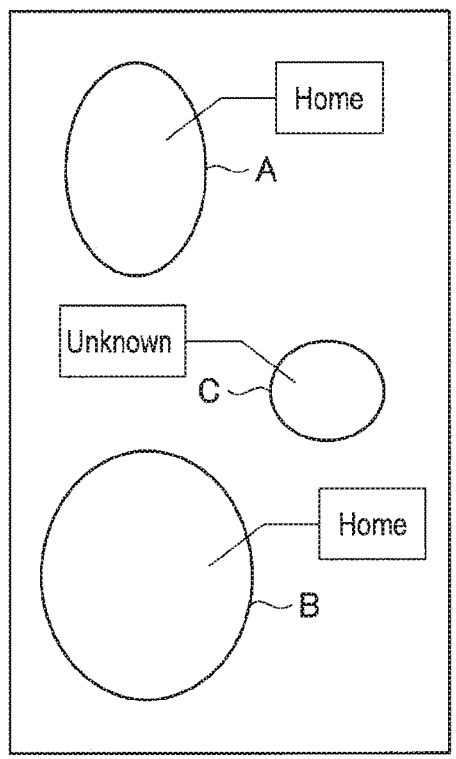
FIG. 17 is a diagram illustrating an example of a data distribution map generated by a learning unit according to a second embodiment of the present disclosure.

FIG. 17 is a diagram illustrating an example of a data distribution map generated by the learning unit 220 according to the present embodiment. As described above, in the present embodiment, the learning can be performed using both the data with high reliability and the data with low reliability as the position information related to the fence. In other words, the learning according to the present embodiment may be semi-supervised learning in which data with a label and data with no label are mixed. At this time, the data distribution map generated from the feature quantities extracted by the learning unit 220 may include a plurality of clusters based on an affinity between data. In the example of FIG. 17, a case in which three clusters A to C are formed is illustrated.

In general, data belonging to the same cluster often correspond to the same correct answer label. Therefore, for example, as illustrated in FIG. 17, in a case where there is data labeled Home as in the clusters A and C, the learning unit 220 may add the label of Home to all pieces of data included in a corresponding cluster. Similarly, in the cluster C only including data with no label, all pieces of data are likely to correspond to the same correct answer label. For this reason, in the present embodiment, for example, in the cluster C, by requiring the user to label data close to the center of gravity of the cluster, it is possible to significantly increase the number of data with a label while minimizing the burden related to the labeling on the user and realize higher accuracy determination of entering and leaving.

Further, in the present embodiment, the user may be required to give priority to labeling regarding data located near the boundary of the cluster as well as data located near the center of gravity of the cluster. In this case, it is possible to effectively reinforce an area with low likelihood. Further, in the present embodiment, labeling related to a section in which the user is certainly located may be requested on the basis of detection of a long stay by behavior recognition or the like.

At this time, the learning unit 220 according to the present embodiment may perform the above process using a neural network that performs semi-supervised learning using, for example, a variational autoencoder (VAE). Here, the VAE refers to a technique of fusing variational Bayes and an auto-encoder in order to learn deep generative models (DGM). In the VAE, a variational lower limit is used instead of a loss function, unlike a general auto encoder. Further, one of the features of the VAE is that it has a stochastic layer (Gauss sampling layer) in a middle layer for calculation of the variational lower limit.

Although the VAE is a technique of the related art used for unsupervised learning, in the present embodiment, semi-supervised learning can be performed using an extended VAE. More specifically, the learning unit 220 according to the present embodiment may perform semi-supervised learning by combining a VAE with an expanded label input and a recognition model.

Figure 18:
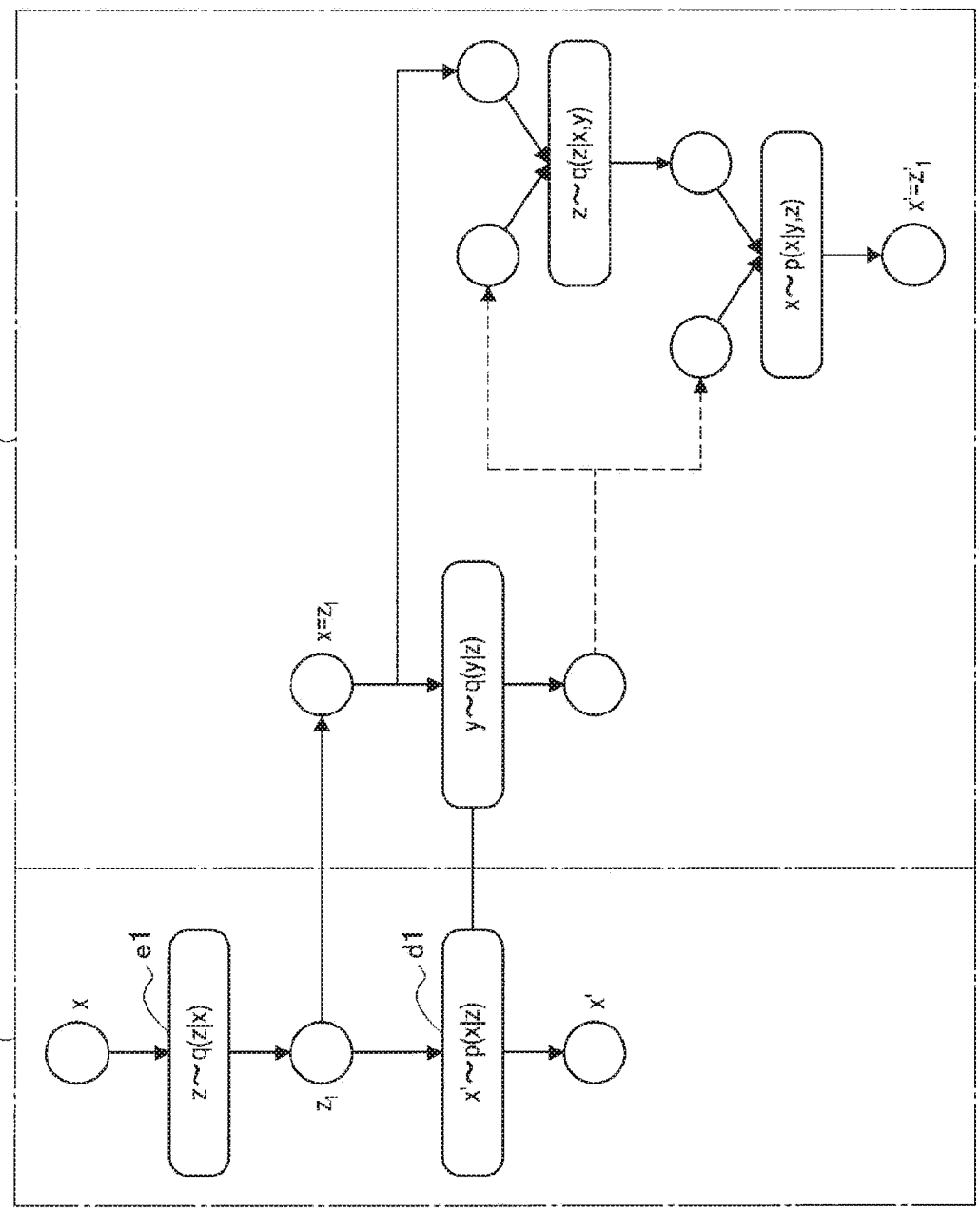
FIG. 18 is a diagram illustrating a network structure of a neural network that performs semi-supervised learning using a VAE according to the embodiment.

FIG. 18 is a diagram illustrating a network structure of a neural network NN1 which performs semi-supervised learning using the VAE. As illustrated in FIG. 18, the neural network NN1 includes a model M1 and a model M2.

Here, the model M1 is a VAE that performs prior learning by unsupervised learning. More specifically, the model M1 can model an inference distribution by an encoder e1 and model a generation distribution by a decoder dl. At this time, the objective function of the model M1 is expressed by a variational lower limit of a model evidence. Incidentally, a marginalization process by an internal variable $z_1$ included in the objective function is approximated by sampling integration.

Further, the model M2 is a model that performs actual semi-supervised learning. Specifically, the model M2 can perform semi-supervised learning using feature quantities generated by the model M1 as learning data. In other words, feature extraction by the model M1 can also be regarded as processing of learning data used for the model M2.

The overview of the learning according to the present embodiment has been described above. Incidentally, the semi-supervised learning using the VAE has been described as an example, but for the learning according to the present embodiment, for example, algorithms such as virtual adversarial training (VAT) and auxiliary DGM (ADGM) may be used. Further, in the following description, differences with the first embodiment will be mainly described, and detailed descriptions of configurations, features, effects, and the like common to the first embodiment will be omitted.

3.2. Specific Example of Label Addition Request

Next, a label addition request according to the present embodiment will be described using a specific example. The operation control unit 130 of the information processing terminal 10 can control an output related to the label addition request for data to which the learning unit 220 determines that it is necessary to add a label, that is, data with no label.

Figure 19:
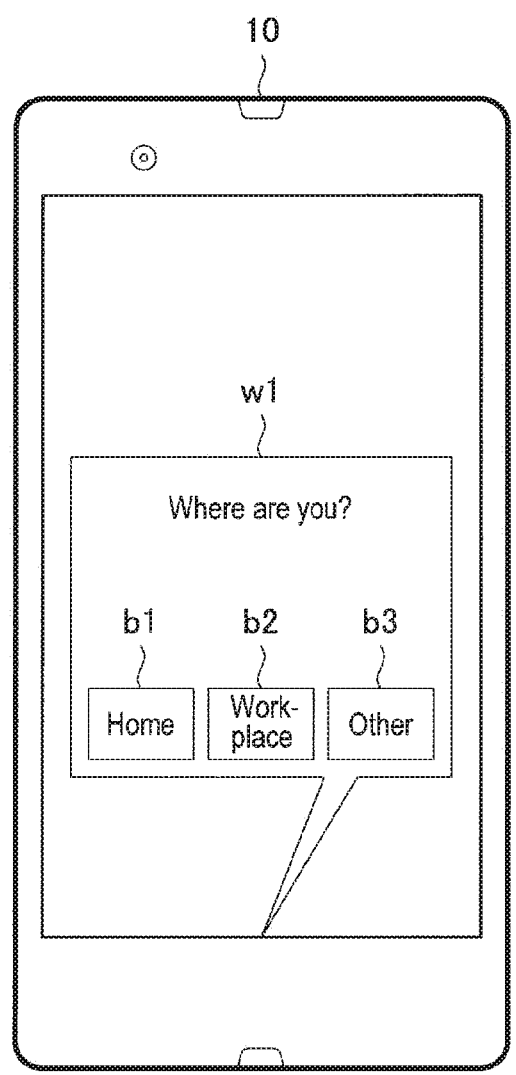
FIG. 19 is a diagram illustrating an example of a label addition request according to the embodiment.

FIG. 19 is a diagram illustrating an example of a label addition request according to the present embodiment. In the example of FIG. 19, the operation control unit 130 causes the output unit 140 of the information processing terminal 10 which is a smartphone to display a window w1 for requesting a label addition. At this time, buttons b1 to b3 or the like for selecting a label may be arranged in the window w1. As the display control is controlled as described above, the burden of the label input on the user can be reduced. Further, the operation control unit 130 may perform the output control in real time as illustrated in FIG. 19 or may record the addition request and present a history to the user collectively.

Figure 20:
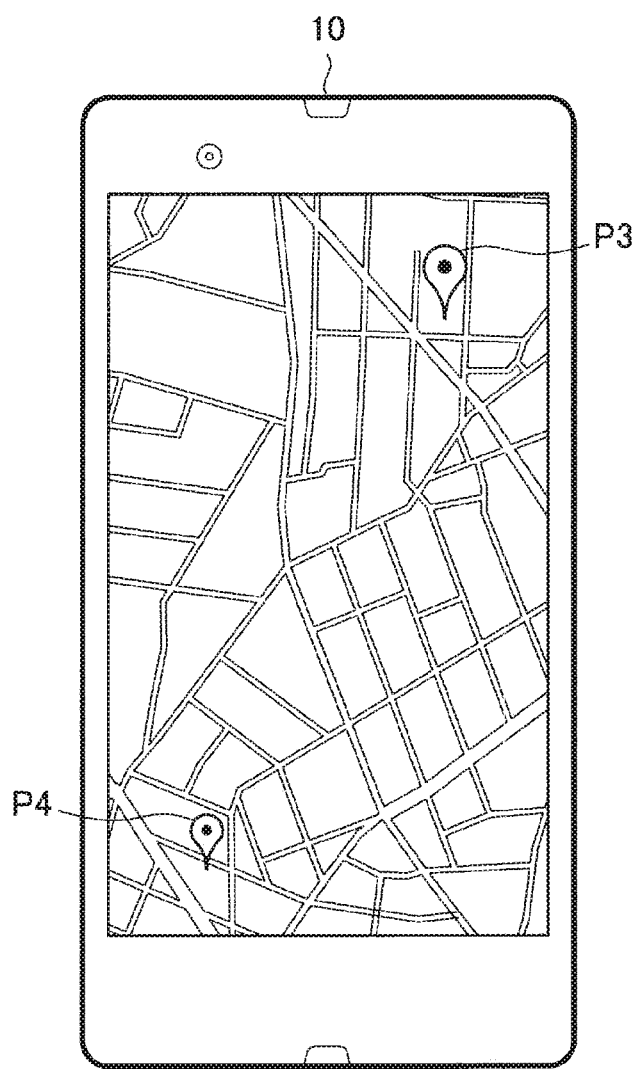
FIG. 20 is a diagram illustrating an example in which an operation control unit according to the embodiment performs control related to a label addition request on a map application.

FIG. 20 is a diagram illustrating an example in which the operation control unit 130 performs control related to the label addition request on the map application. As illustrated in FIG. 20, the operation control unit 130 according to the present embodiment may cause the output unit 140 to output a plurality of pieces of location information related to the label addition request. In the example of FIG. 20, the operation control unit 130 causes addition requests related to two places P3 and P4 to be simultaneously displayed on the map. As described above, the operation control unit 130 according to the present embodiment simultaneously visualizes a plurality of places related to the addition requests, so that the user can intuitively comprehend an undetermined area.

Further, the operation control unit 130 according to the present embodiment may provide the user with an incentive corresponding to a form of an application in order to realize more efficient label addition. For example, the operation control unit 130 may perform control of releasing a function usable in an application on the basis of an addition status of a label added on the basis of the addition request.

Figure 21:
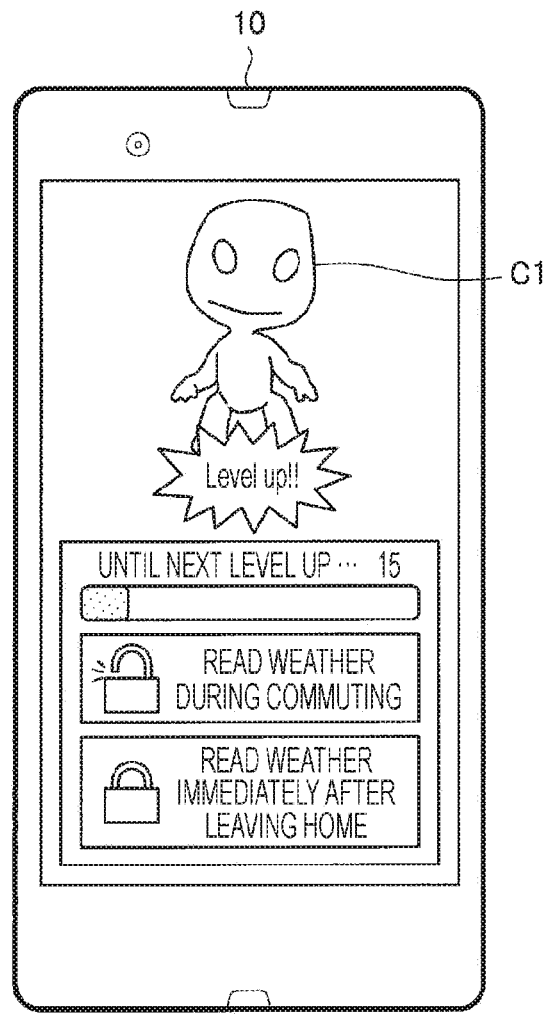
FIG. 21 is a diagram for describing an incentive corresponding to a label addition status according to the embodiment.

FIG. 21 is a diagram for describing an incentive corresponding to the addition status of the label according to the present embodiment. In FIG. 21, a user interface of an application output to the output unit 140 of the information processing terminal 10 is illustrated. As illustrated in FIG. 21, for example, the operation control unit 130 may open a function which can be ignited upon detection of entering and leaving the fence in accordance with the number of labelings performed by the user. In an example of FIG. 21, a form in which a function of reading the weather during commuting is opened is illustrated, and it is illustrated that the function of reading the weather immediately after leaving house is opened by labeling 15 times more. As described above, the operation control unit 130 can promote more active labeling by presenting the user with the incentive corresponding to the label addition request.

Further, in a case where the application is a game application, the operation control unit 130 may provide the user with items or experience points which can be used in the application in accordance with the addition status of the label. For example, in a case where a character C1 illustrated in FIG. 21 is a breeding target in a game, the operation control unit 130 may provide an experience value for breeding the character C1, an item with which the character C1 can be equipped, or the like. Further, the equipment items may be set on the basis of, for example, the type of sensor information. For example, an item such as clothes or bags may be set in the sensor information collected by the motion sensor installed in the shoes described above, and a shield or the like may be set in the sensor information acquired from the door. Further, the operation control unit 130 can encourage the user to perform autonomous labeling by performing control such that the item is removed from the equipment in a place in which labeling is insufficient.

Further, in the present embodiment, the label addition request may be made on the basis of the sensor information acquired from other devices. For example, the operation control unit 130 may perform the output control related to the label addition request when an imaging sensor obtained from an indoor camera or the like indicates a location of the user. In this case, for example, a label with certainty can be added to the teacher data obtained when the user is surely at home.

Further, the operation control unit 130 according to the present embodiment may perform the output control related to the label addition request on the basis of the feedback of the user described in the first embodiment. For example, the operation control unit 130 may make the label addition request when the user performs an input indicating that the ignition timing is fast or late. According to the above function, when the user is dissatisfied with the function, it is possible to present an improvement plan and realize a more effective label addition request.

3.3. Comparison of Effects with First Embodiment

The second embodiment of the present disclosure has been described above. As described above, according to the present embodiment, it is possible to use data with low reliability as the position information related to the fence as well. Here, the effects of the first embodiment according to the present disclosure are compared with the effects of the second embodiment.

Figure 22:
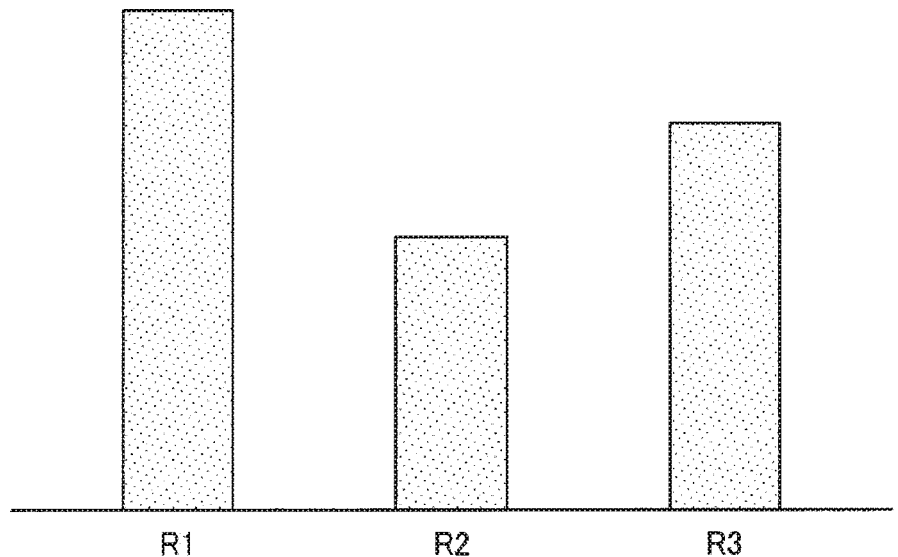
FIG. 22 is a diagram for describing effects of the first and second embodiments according to the present disclosure.

FIG. 22 is a schematic diagram for describing the effects exerted by the first and second embodiments according to the present disclosure. In FIG. 22, a relation of an ignition accuracy R1 in a case where strict label addition to the collected sensor information is performed manually for sufficient days, an ignition accuracy R2 according to the first embodiment, and an ignition accuracy R3 according to the second embodiment is illustrated.

Referring to FIG. 22, it can be understood that high ignition accuracy can be expected in a case where strict manual label addition is performed. However, strict manual label addition is not practical because it imposes a heavy burden on the user unless it is performed experimentally. Further, in a case where labeling is necessary for each application, the burden on the user is further increased.

On the other hand, the ignition accuracy R2 according to the first embodiment can be realized without the burden on the user by realizing the automatic label generation although the accuracy is somewhat sacrificed as compared with a case in which the strict label addition is performed manually. Further, the ignition accuracy R3 according to the second embodiment slightly increases the burden on the user as compared with the ignition accuracy R2 according to the first embodiment, but it can be expected to become equivalent to a case in which strict label addition is performed. As described above, according to the second embodiment of the present disclosure, it is possible to efficiently collect the labels while minimizing the burden on the user related to the label addition and realize high accuracy determination of entering and leaving.

4. THIRD EMBODIMENT

4.1. Overview of Third Embodiment

Next, a third embodiment of the present disclosure will be described. In the first embodiment and the second embodiment described above, the technique for improving the ignition accuracy related to the determination of entering and leaving the fence has mainly been described. On the other hand, the function according to the third embodiment of the present disclosure is to provide a fence application with better operability and high convenience.

For example, many fence applications often use a single definitive boundary for setting and determination of the fence. In other words, in many fence applications, a single value or a solid circle is used for setting the fence, and the fence is determined on the basis of whether or not collected data exceeds a threshold value corresponding to the value or the solid circle. However, since the input burden increases as the number of fences increases, the user may desire a more ambient fence setting. Examples of the ambiguous fence setting include an ambiguous setting regarding a time such as "around 17:00" and an ambiguous setting regarding a place such as "if it reaches near to a place A".

Therefore, in the third embodiment of the present disclosure, the fence is automatically set on the basis of the ambiguous fence setting input by the user, so that it is possible to perform more flexible ignition control on the fence. According to the above-described function of the present embodiment, it is possible to reduce the user's input burden on the fence setting and to realize function ignition more in line with the user's intention.

The overview of the learning according to the present embodiment has been described above. Incidentally, in the following description, differences with the first embodiment and the second embodiment will be mainly described, and detailed descriptions of configurations, features, effects, and the like common to the first and second embodiments will be omitted.

4.2. Specific Example of Ambiguous Fence Setting

Next, the ambiguous fence setting according to the present embodiment and a specific example of the ignition control for the ambiguous fence setting will be described. As described above, in the present embodiment, flexible ignition control can be performed on the ambient fence setting input by the user. Here, the ambiguous fence setting may be, for example, related to a place and a time.

Figure 23:
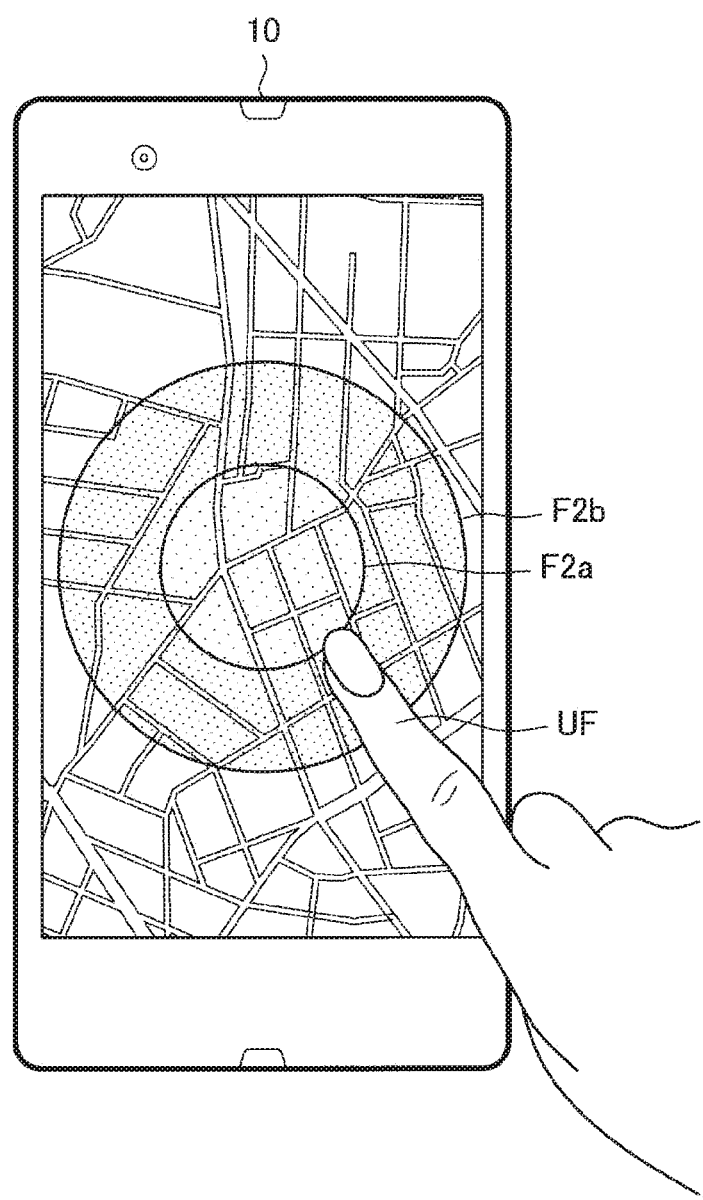
FIG. 23 illustrates an example of an ambiguous fence setting according to a third embodiment of the present disclosure.

FIG. 23 is an example of the ambiguous fence setting according to the present embodiment. FIG. 23 illustrates an example in a case where the user performs ambiguous fence setting related to the location in the user interface displayed in the output unit 140 of the information processing terminal 10. In the example of FIG. 23, the user sets the fence F2a and the fence F2b by touch operation using the finger UF or the like.

Here, the user may not set two fences F2a and F2b separately by separate operations. In other words, the operation control unit 130 according to the present embodiment can automatically set a designated area, that is, the fences F2a and F2b on the basis of an ambiguous input detected by the input unit 150. More specifically, the operation control unit 130 according to the present embodiment may cause the output unit 140 to output a user interface related to a fence input and set the fence on the basis of the ambiguous input input in the user interface.

Here, the ambiguous input may include a touch operation in a user interface as illustrated in FIG. 23. Incidentally, the touch operations may include various types of operations such as tap, swipe, drag, flick, and pinch. Therefore, the operation control unit 130 according to the present embodiment may determine, for example, a time, an intensity, a type, an interval, or the like of the touch operation detected by the input unit 150 and set F2a and F2b as illustrated in FIG. 23.

In this case, for example, as illustrated in FIG. 23, the operation control unit 130 may perform the ambiguous fence setting using concentric circles with different shades. At this time, for example, the operation control unit 130 can perform operation control of causing the function to be ignited only in a case where a certainty factor is high for the fence F2a with a low concentration and causing the function to be ignited even in a case where a certainty factor is low for the fence F2b with a high concentration.

Incidentally, in FIG. 23, the example in which the operation control unit 130 sets the fence using the concentric circles with different shades in accordance with the touch operation of the user has been described, but the shape of the ambiguous fence set by the operation control unit 130 according to the present embodiment is not limited to this example. For example, the ambiguous fence set by the operation control unit 130 may have a triangular shape, a rectangular shape, or other polygonal shapes or a more flexible or complex shape. Further, for example, the operation control unit 130 can automatically generate the shape of the fence from a plurality of points specified by the user by the tap operation. In this case, the user can set the fence with fewer operations, so that the burden can be reduced.

Further, the ambiguous input related to the fence setting of the present embodiment is not limited to the touch operation illustrated in FIG. 23. For example, the user may set the fence by voice. The operation control unit 130 according to the present embodiment can also perform the ambiguous fence setting on the basis of the speech of the user which is converted into a character string by voice recognition. In other words, the ambiguous input according to the present embodiment may include a character string input.

Figure 24:
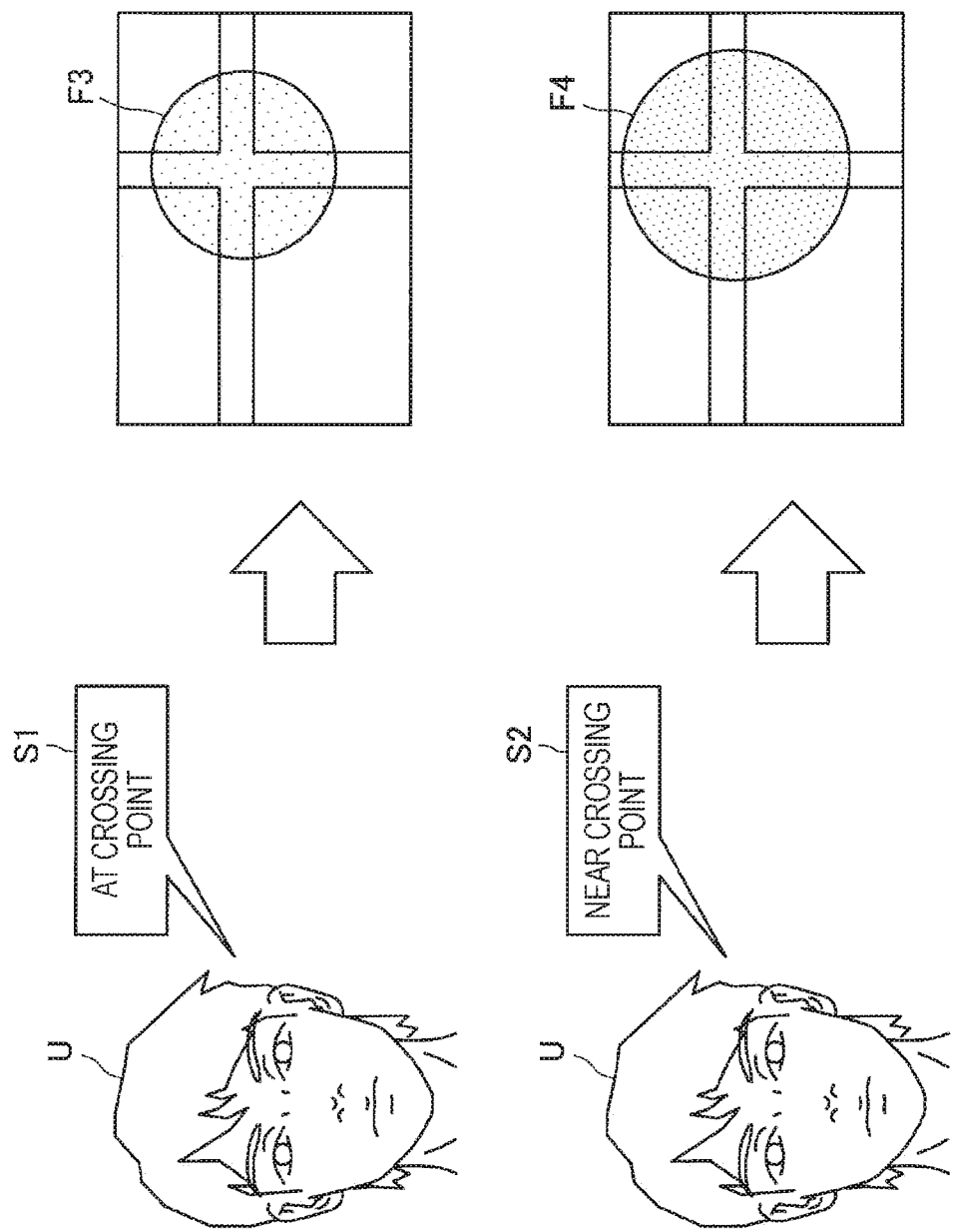
FIG. 24 is a diagram illustrating an example of an ambiguous fence setting by character string input according to the embodiment.

FIG. 24 is a diagram illustrating an example of the ambiguous fence setting by character string input according to the present embodiment. An upper part of FIG. 24 illustrates an example in which the operation control unit 130 sets a fence F3 on the basis of a speech S1 performed by a user U. In the present example, the speech S1 can be a clear input: "at crossing point". In this case, the operation control unit 130 according to the present embodiment may automatically set the fence F3 with a low concentration which causes the function to be ignited only in a case where the certainty factor is high.

On the other hand, a lower part of FIG. 24 illustrates an example in which the operation control unit 130 sets a fence F4 on the basis of a speech S2 performed by the user U. In the present example, the speech S2 can be an ambiguous input such as "near crossing point". In this case, the operation control unit 130 according to the present embodiment may automatically set the fence F4 with a high concentration which causes the function to be ignited even in a case where the certainty factor is low, or may automatically set a multi-layered circle (gradation) whose concentration increases as it is closer to the center. In other words, the stage of the ambiguous fence according to the present embodiment is not limited to two stages of shades. Further, at this time, the operation control unit 130 may set the fence F4 to a wider range than the fence F3 illustrated in the upper part of FIG. 24.

Further, the operation control unit 130 according to the present embodiment may use an element in the daily life of the user as a parameter in connection with the ambiguous fence setting. For example, a case in which the user performs a speech "Please let me know when Mr. A comes close". At this time, in a case where the user is resident in Japan, and Mr. A is resident in the United States, the operation control unit 130 may set a fence pf causing the function to be ignited in a case where Mr. A visits Japan. Further, the operation control unit 130 may give a fence setting notification to the user by performing output such as "A notification will be given when Mr. A visits Japan".

On the other hand, in a case where the user is resident in Shibuya, and Mr. A is resident in Shinjuku, the operation control unit 130 may set a fence of causing the function to be ignited in a case where Mr. A approaches within one station. Further, the operation control unit 130 may give a fence setting notification to the user by performing an output such as "A notification will be given when Mr. A approaches within one station".

On the other hand, in a case where the user and Mr. A usually work side by side, the operation control unit 130 may set a fence of causing the function to be ignited in a case where Mr. A approaches outside an office. Further, the operation control unit 130 may give a fence setting notification to the user by performing an output such as "A notification will be given when Mr. A comes close outside the office". According to the function of the operation control unit 130 of the present embodiment, it becomes possible to dynamically use the parameters related to the daily life of the user for the fence setting, and it is possible to implement the fence application in which the burden on the user is less, and there is no discomfort.

The specific examples of the fence setting based on the ambiguous input according to the present embodiment have been described above. As described above, according to the operation control unit 130 of the present embodiment, it is possible to reduce the user's input burden related to the fence setting and realize a more flexible fence setting.

Incidentally, an information notification is assumed as a function provided on the basis of the fence set as described above. The operation control unit 130 may, for example, control a queue of notifications in consideration of the concentration of the fence. As a specific example, in an application that continuously reproduces content such as news or a video, the operation control unit 130 may perform, for example, control of causing content to be interrupted at the head of the queue when the concentration is high. Further, in a case where the concentration exceeds a threshold value, the operation control unit 130 can also perform, for example, control of switching content during reproduction. At this time, the operation control unit 130 can provide information with less discomfort for the user, for example," by interposing an output such as "here is news although it is in the middle of a program". Incidentally, in a case where the concentration of the content is low, the operation control unit 130 may control by setting a flag indicating that an interrupt is explicitly permitted.

Further, for example, the function provided on the basis of the ambiguous fence setting include various types of setting controls of the information processing terminal 10 or the like. For example, there are cases in which screen brightness or a positioning interval by Wi-Fi, GNSS, or the like can be set in a stepwise manner. For this reason, the operation control unit 130 according to the present embodiment may realize a flexible setting change by performing control corresponding to the strength of the concentration in a case where a setting is possible in a stepwise manner. As an example, the operation control unit 130 may perform control such that an interval related to Wi-Fi detection or the like is not larger than necessary in connection with a fence with a low concentration.

Further, the operation control unit 130 according to the present embodiment may perform various expression control corresponding to the concentration of fence. The expression control may include, for example, a superimposed expression, a voice expression, or the like in the information processing terminal 10 which is a head mounted display or a glasses-type wearable device. For example, the operation control unit 130 according to the present embodiment can perform control such that the user can more intuitively perceive a setting as a cylinder or the like corresponding to the concentration of the fence is superimposed.

5. HARDWARE CONFIGURATION EXAMPLE

Figure 25:
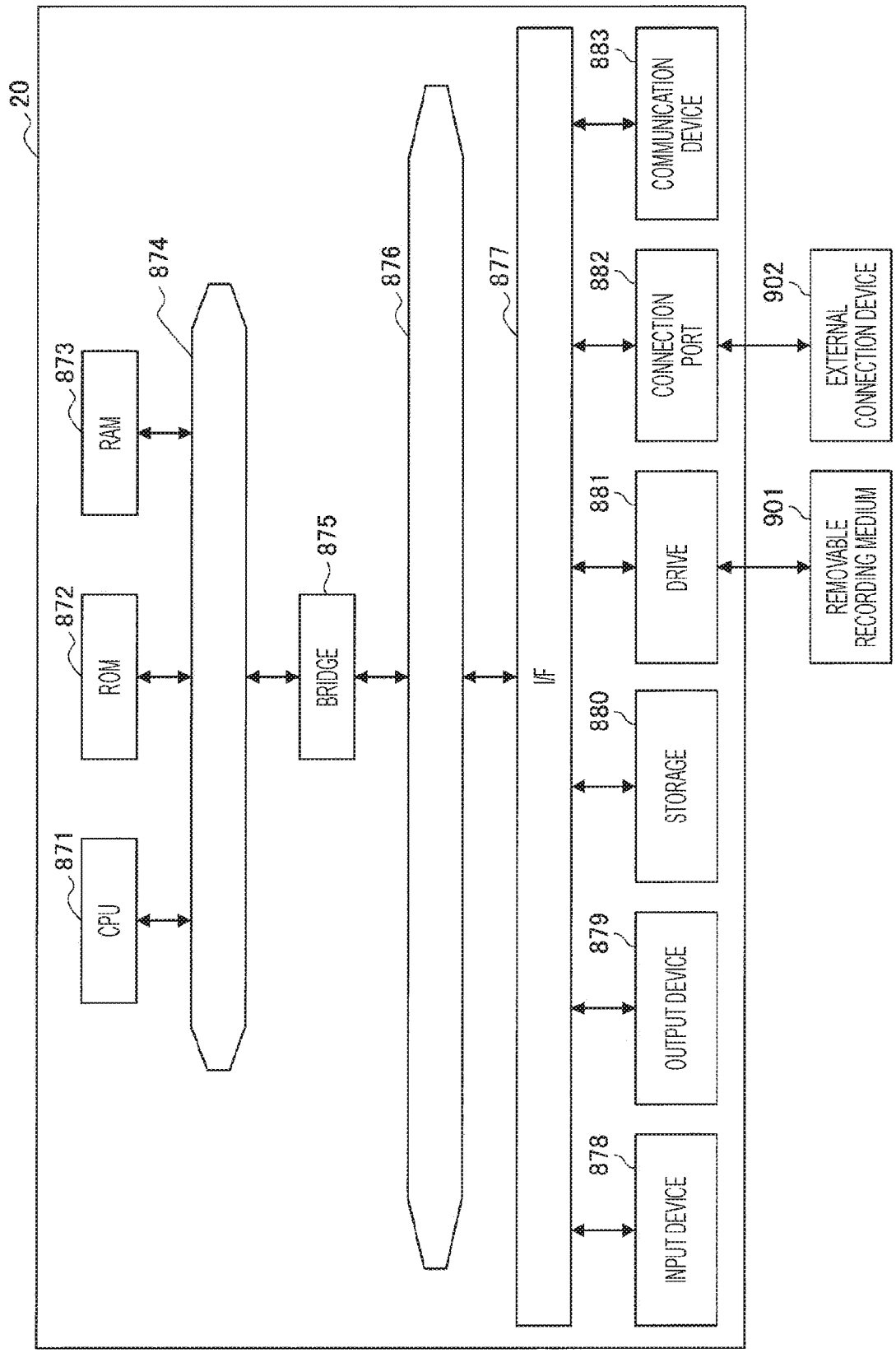
FIG. 25 is a hardware configuration example according to the present disclosure.

Next, a hardware configuration example common to the information processing terminal 10 and the information processing server 20 according to the present disclosure will be described. FIG. 25 is a block diagram illustrating a hardware configuration example of the information processing terminal 10 and the information processing server 20 according to the present disclosure. Referring to FIG. 25, each of the information processing terminal 10 and the information processing server 20 according to the present disclosure includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Incidentally, the hardware configuration illustrated here is an example, and some of the components may be omitted. Further, components other than the components illustrated here may be included.

(CPU 871)

The CPU 871 functions as, for example, an arithmetic processing device or a control device, and controls all or some of operations of the respective components on the basis of various types of programs recorded in the ROM 872, RAM 873, storage 880, or a removable recording medium 901.

(ROM 872 and RAM 873)

The ROM 872 is a means that stores a program read by the CPU 871, data used for an operation, and the like. The RAM 873 temporarily or permanently stores, for example, a program read by the CPU 871 and various types of parameters that appropriately change when the program is executed.

(Host Bus 874, Bridge 875, External Bus 876, and Interface 877)

The CPU 871, the ROM 872, and the RAM 873 are connected to one another via, for example, the host bus 874 capable of supporting high-speed data transmission. On the other hand, the host bus 874 is connected to, for example, an external bus 876 whose data transmission rate is relatively slow via the bridge 875. Further, the external bus 876 is connected to various components via the interface 877.

(Input Device 878)

As the input device 878, for example, a mouse, a keyboard, a touch panel, a button, a switch, a lever, or the like is used. Further, a remote controller capable of transmitting a control signal using infrared rays or other radio waves may be used as the input device 878. Further, the input device 878 includes an audio input device such as a microphone.

(Output Device 879)

The output device 879 is a device capable of notifying the user of acquired information visually or aurally such as a display device such as a cathode ray tube (CRT), an LCD, or an organic EL, an audio output device such as a speaker or a headphone, a printer, a mobile phone, or a facsimile.

(Storage 880)

The storage 880 is a device that stores various types of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded in the removable recording medium 901 such as a magnetic disk, an optical disk, a magneto-optical disk, or a semiconductor memory or writes information in the removable recording medium 901.

(Removable Recording Medium 901)

The removable recording medium 901 is, for example, a DVD medium, a Blu-ray (registered trademark) medium, a HD DVD medium, various semiconductor storage media, or the like. Of course, the removable recording medium 901 may be, for example, an IC card equipped with a non-contact IC chip, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for establishing a connection with a network such as, for example, a wired or wireless LAN, a communication card for Bluetooth (registered trademark) or wireless USB (WUSB), an optical communication router, an asymmetric digital subscriber line (ADSL) router, or various types of communication modems.

6. CONCLUSION

As described above, the information processing terminal 10 according to the present disclosure can collect various types of sensor information used as the teacher data or the student data in the learning related to the determination of entering and leaving the fence. Further, according to the learning technique of the present disclosure, it is possible to automatically generate the label on the basis of the collected the teacher data and generate a high accuracy determinator. Further, the information processing terminal 10 according to the present disclosure can flexibly control operations of various applications by performing the determination related to entering and leaving the fence using the generated determinator. According to such a configuration, it is possible to detect entering and leaving with a high degree of accuracy without increasing the burden on the user.

Although the exemplary embodiments of the present disclosure have been described in detail with reference to the appended drawings, the technical scope of the present disclosure is not limited to such examples. It will be obvious to those skilled in the art of the present disclosure that various modifications or alterations can be made within the scope of the technical spirit described in claims set forth below and are naturally understood to belong to the technical scope of the present disclosure.

Further, the effects described in this specification are merely explanatory or illustrative and not limiting. In other words, the technology according to the present disclosure may exhibit other effects apparent to those skilled in the art from the description of this specification, in addition to or instead of the effects described above.

Further, the respective steps of the processes of the information processing terminal 10 and the information processing server 20 in this specification need not necessarily be processed in chronological order in accordance with the order described as the flowcharts. For example, the respective steps involved in the processes of the information processing terminal 10 and the information processing server 20 may be processed in an order different from the order described as the flowcharts or may be processed in parallel.

Incidentally, the following configurations also belong to the technical scope of the present disclosure.

(1)

An information processing device, including:

a determining unit that determines entering and leaving related to a designated area on the basis of collected sensor information, in which the determining unit performs determination related to the entering and leaving on the basis of a learning result learned by associating data related to the entering and leaving.

(2)

The information processing device according to (1), in which the determining unit performs the determination related to the entering and leaving on the basis of a learning result learned by associating teacher data with student data, and the student data includes sensor data of the same type as the sensor information.

(3)

The information processing device according to (2), in which the teacher data includes at least one of longitude latitude data or ultraviolet data.

(4)

The information processing device according to (2) or (3), in which the teacher data includes noise-removed longitude latitude data.

(5)

The information processing device according to any one of (2) to (4), in which the student data includes a radio signal.

(6)

The information processing device according to any one of (1) to (5), further including an operation control unit that controls an application on the basis of a determination result by the determining unit.

(7)

The information processing device according to (6), in which the operation control unit controls the application on the basis of a learning result learned on the basis of feedback on an operation timing of the application.

(8)

The information processing device according to (7), in which the operation control unit controls an output related to a request for the feedback.

(9)

The information processing device according to (6), in which the determining unit performs the determination related to the entering and leaving on the basis of a learning result learned including data with no label.

(10)

The information processing device according to (9), in which the operation control unit controls an output related to an addition request of a label to the data with no label.

(11)

The information processing device according to (10), in which the operation control unit causes a plurality of pieces of location information related to the addition request to be output.

(12)

The information processing device according to (10) or (11), in which the operation control unit controls the operation of the application on the basis of an addition status of the label added on the basis of the addition request.

(13)

The information processing device according to any one of (6) to (12), in which the operation control unit sets the designated area on the basis of a detected ambiguous input.

(14)
The information processing device according to (13),
in which the operation control unit causes a user interface related to an input of the designated area to be output and sets the designated area on the basis of the ambiguous input in the user interface.
(15)
The information processing device according to (14),
in which the ambiguous input includes a touch operation in the user interface.
(16)
The information processing device according to any one of (13) to (15),
in which the ambiguous input includes a character string input.
(17)
The information processing device according to any one of (1) to (16), further including
a sensor unit that collects the sensor information.
(18)
The information processing device according to any one of (1) to (17), further including
a learning unit that performs learning based on the sensor information.
(19)
An information processing method, including:
determining, by a processor, entering and leaving related to a designated area on the basis of collected sensor information,
in which the determining includes
performing determination related to the entering and leaving on the basis of a learning result learned by associating data related to the entering and leaving.
(20)
A program causing a computer to function as:
an information processing device including
a determining unit that determines entering and leaving related to a designated area on the basis of collected sensor information,
in which the determining unit performs determination related to the entering and leaving on the basis of a learning result learned by associating data related to the entering and leaving.

REFERENCE SIGNS LIST

10 Information processing terminal
110 Sensor unit
120 Determining unit
130 Operation control unit
140 Output unit
150 Input unit
160 Server communication unit
20 Information processing server
210 Noise removing unit
220 Learning unit
230 Learning data storage unit
240 Terminal communication unit
30 Network

The invention claimed is:

1. An information processing device, comprising:
a determining unit configured to determine entry and exit related to a designated area based on collected sensor information and a model,
wherein the model is based on a result of a learning process to learn the collected sensor information and the entry and the exit related to the designated area, and the result of the learning process comprises data with no label; and a control unit configured to:
control an output related to an addition request of a label to the data with no label; and
control an activation of an application based on:
a determination result of the determining unit, and
an addition status of the label, wherein the label is added based on the addition request.

2. The information processing device according to claim 1, wherein
the determining unit is further configured to determine information related to the entry and the exit based on a learning result learned by association of teacher data with student data, and
the student data includes sensor data of a same type as the collected sensor information.

3. The information processing device according to claim 2, wherein the teacher data includes at least one of longitude latitude data or ultraviolet data.

4. The information processing device according to claim 2, wherein the teacher data includes noise-removed longitude latitude data.

5. The information processing device according to claim 2, wherein the student data includes a radio signal.

6. The information processing device according to claim 1, wherein the control unit is further configured to control the application based on the result of the learning process to further learn feedback on an activation timing of the application.

7. The information processing device according to claim 6, wherein the control unit is further configured to control an output related to a request for the feedback.

8. The information processing device according to claim 1, wherein the control unit is further configured to cause a plurality of pieces of location information related to the addition request to be output.

9. The information processing device according to claim 1, wherein the control unit is further configured to set the designated area based on detection of ambiguous input.

10. The information processing device according to claim 9, wherein the control unit is further configured to cause a user interface related to an input of the designated area to be output and set the designated area based on the ambiguous input in the user interface.

11. The information processing device according to claim 10, wherein the ambiguous input includes a touch operation in the user interface.

12. The information processing device according to claim 9, wherein the ambiguous input includes a character string input.

13. The information processing device according to claim 1, further comprising a sensor unit configured to collect sensor information.

14. The information processing device according to claim 1, further comprising a learning unit configured to execute the learning process based on the collected sensor information.

15. An information processing method, comprising:
determining, by a processor, entry and exit related to a designated area based on collected sensor information and a model,
wherein the model is based on a result of a learning process to learn the collected sensor information and the entry and the exit related to the designated area, and the result of the learning process comprises data with no label;

controlling, by the processor, an output related to an addition request of a label to the data with no label; and controlling, by the processor, an activation of an application based on:
- a result of the determination, and
- an addition status of the label, wherein the label is added based on the addition request.

16. A non-transitory computer-readable medium having stored thereon computer-readable instructions, which when executed by a computer, cause the computer to execute operations, the operations comprising:

determining entry and exit related to a designated area based on collected sensor information and a model,
wherein the model is based on a result of a learning process to learn the collected sensor information and the entry and the exit related to the designation area, and the result of the learning process comprises data with no label;

controlling an output related to an addition request of a label to the data with no label; and controlling an activation of an application based on:
- a result of the determination, and
- an addition status of the label, wherein the label is added based on the addition request.

17. An information processing device, comprising:

a determining unit configured to determine entry and exit related to a designated area based on collected sensor information and a model,
wherein the model is based on a result of a learning process to learn the collected sensor information and the entry and the exit related to the designated area, and the result of the learning process comprises data with no label; and a control unit configured to:

control an activation of an application based on a determination result of the determining unit;

control an output based on an addition request of a label to the data with no label; and cause a plurality of pieces of location information related to the addition request to be output.

* * * * *